(12) United States Patent
Honda

(10) Patent No.: US 7,266,629 B2
(45) Date of Patent: Sep. 4, 2007

(54) DATA TRANSFER CONTROL DEVICE AND ELECTRONIC INSTRUMENT GENERATING INTERFACE SIGNAL OF SIGNAL TYPE ACCORDING TO INTERFACE INFORMATION SET IN INTERNAL REGISTER

(75) Inventor: Hiroyasu Honda, Nagano (JP)

(73) Assignee: Seiko Epson Corporation (JP)

( * ) Notice: Subject to any disclaimer, the term of this patent is extended or adjusted under 35 U.S.C. 154(b) by 198 days.

(21) Appl. No.: 11/063,007

(22) Filed: Feb. 22, 2005

(65) Prior Publication Data

US 2005/0204087 A1 Sep. 15, 2005

(30) Foreign Application Priority Data

Mar. 9, 2004 (JP) ............................. 2004-066029

(51) Int. Cl.
G06F 13/38 (2006.01)
G06F 5/00 (2006.01)

(52) U.S. Cl. .................. 710/305; 370/464; 370/912

(58) Field of Classification Search ............... 710/305, 710/31, 33, 38, 100, 300, 316; 370/257, 370/229, 464, 351, 912, 915; 365/185.22; 379/100.17; 709/230–233, 253
See application file for complete search history.

(56) References Cited

U.S. PATENT DOCUMENTS

| | | | | |
|---|---|---|---|---|
| 4,782,283 A * | 11/1988 | Zasio | ........................ | 714/726 |
| 4,954,951 A * | 9/1990 | Hyatt | ........................ | 711/218 |
| 6,466,204 B1 * | 10/2002 | Oh | ........................ | 345/213 |
| 6,507,215 B1 * | 1/2003 | Piasecki et al. | ............... | 326/41 |
| 6,584,536 B1 * | 6/2003 | Deng | ......................... | 710/310 |
| 6,754,185 B1 * | 6/2004 | Banerjee et al. | ............ | 370/282 |
| 6,771,668 B2 * | 8/2004 | Fukunaga et al. | ......... | 370/489 |
| 7,103,008 B2 * | 9/2006 | Greenblat et al. | ......... | 370/258 |
| 2002/0011998 A1 | 1/2002 | Tamura | | |
| 2005/0201157 A1 * | 9/2005 | Honda | .................. | 365/185.22 |
| 2005/0201537 A1 * | 9/2005 | Honda | .................. | 379/100.17 |
| 2005/0201538 A1 * | 9/2005 | Honda | .................. | 379/100.17 |
| 2005/0204087 A1 * | 9/2005 | Honda | ........................ | 710/305 |

FOREIGN PATENT DOCUMENTS

JP 2001-092767 4/2001
JP 2001-222249 8/2001

OTHER PUBLICATIONS

"Universal serial bus enhances vitual instrument—based distributed power monitoring" by Youlng et al. (abstract only) Publication Date:Dec. 2001.*
Communication from Japanese Patent Office re: related application.

* cited by examiner

*Primary Examiner*—Gopal C. Ray
(74) *Attorney, Agent, or Firm*—Harness, Dickey & Pierce, P.L.C.

(57) ABSTRACT

A data transfer control device including: a link controller which analyzes a received packet transferred from a host-side data transfer control device through a serial bus; an interface circuit which generates interface signals and outputs the generated interface signals to an interface bus; and an internal register in which is set interface information for specifying signal types of the interface signals output from the interface circuit. The interface circuit includes first to Nth interface circuits (N is an integer greater than one), and each of the first to Nth interface circuits generates an interface signal of a signal type according to the interface information set in the internal register.

18 Claims, 20 Drawing Sheets

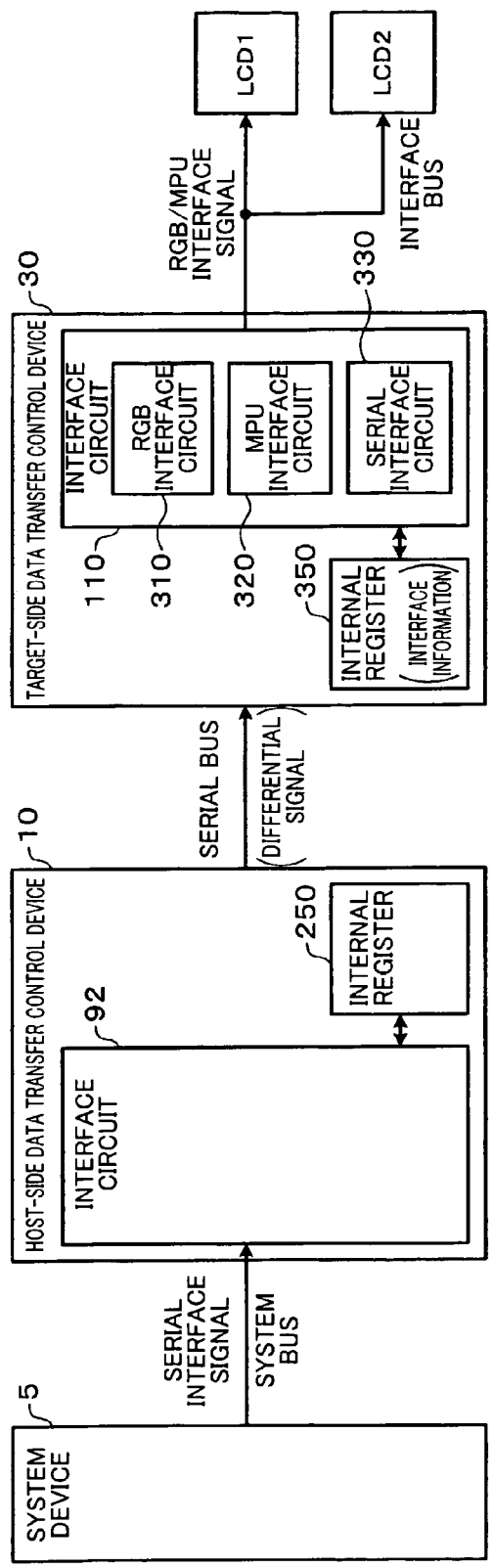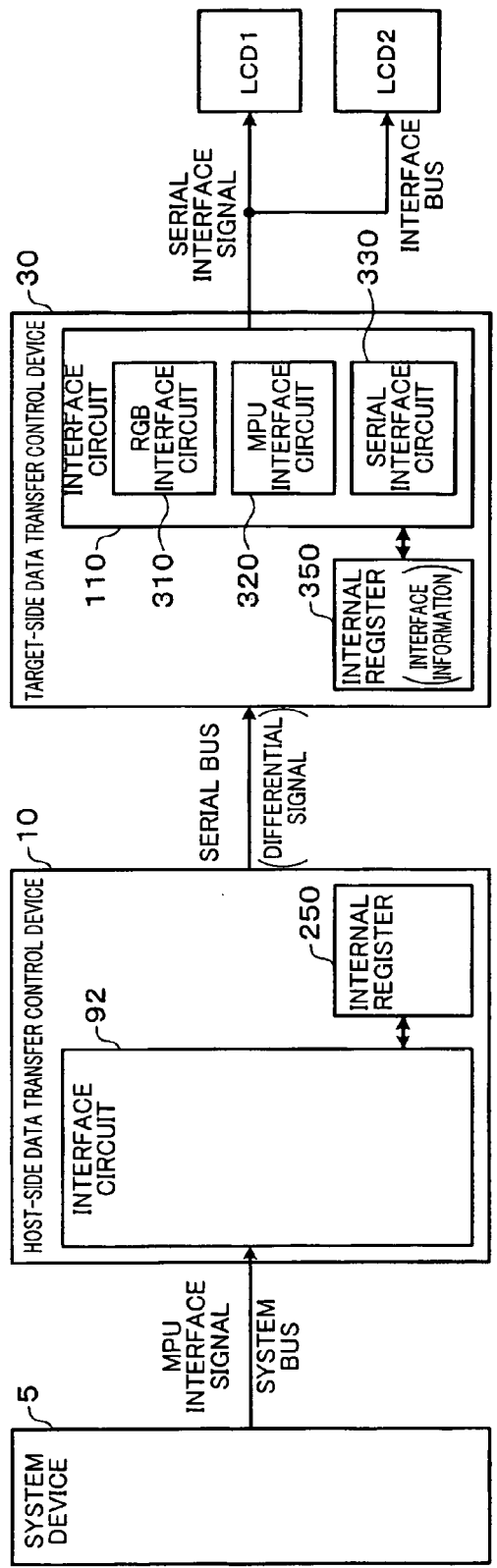

t1=VT   t2=VPW
t3=VDPS t4=VDP t2=HT   t3=HPW
t4=HDPS t5=HDP

FIG. 7A

| Bit | 7 | 6 | 5 | 4 | 3 | 2 | 1 | 0 |
|---|---|---|---|---|---|---|---|---|
| | RESPONSE REQUEST | PACKET TYPE | | | LABEL | | | |
| | RETRY | ADDRESS SIZE | | | — | | | |
| | DATA LENGTH 0 | | | | | | | |
| | DATA LENGTH 1 | | | | | | | |
| | ADDRESS/COMMAND | | | | | | | |
| | CONTINUOUS | ADDRESS AUTOMATIC UPDATE | NUMBER OF UPDATES | | | | | |
| | | | PORT NUMBER | | | | | |
| | DATA/PARAMETER | | | | | | | |
| | CRC0 | | | | | | | |
| | CRC1 | | | | | | | |

FIG. 7B

| Bit | 7 | 6 | 5 | 4 | 3 | 2 | 1 | 0 |
|---|---|---|---|---|---|---|---|---|
| | | PACKET TYPE | | | LABEL | | | |
| | — | | | | — | | | |
| | DATA LENGTH 0 | | | | | | | |
| | DATA LENGTH 1 | | | | | | | |
| | ADDRESS/COMMAND | | | | | | | |
| | SYNCHRONIZATION SIGNAL CODE | | | PORT NUMBER | | | | |
| | DATA/PARAMETER | | | | | | | |
| | CRC0 | | | | | | | |
| | CRC1 | | | | | | | |

FIG. 8

| PORT NUMBER | PORT |
|---|---|
| 00 | DISABLES ALL PORTS |
| 01 | PARALLEL PORT (RGB/MPU) OF LCD1 |
| 02 | SERIAL PORT OF LCD1 |
| 03 | PARALLEL PORT (MPU) OF LCD2 |
| 04 | SERIAL PORT OF LCD2 |
| 05 | PARALLEL PORT OF LCD3 |
| 06 | SERIAL PORT OF LCD3 |
| ⋮ | ⋮ |
| 10 | GENERAL PORT 1 |
| 11 | GENERAL PORT 2 |
| 12 | GENERAL PORT 3 |
| ⋮ | ⋮ |
| 3F | PORT OF INTERNAL REGISTER |

FIG. 9

| SYNCHRONIZATION SIGNAL CODE | MEANING |
|---|---|
| 0 (VS=0, HS=0) | DOES NOT INCLUDE SYNCHRONIZATION SIGNAL |
| 1 (VS=1, HS=0) | INCLUDES VERTICAL SYNCHRONIZATION SIGNAL |
| 2 (VS=0, HS=1) | INCLUDES HORIZONTAL SYNCHRONIZATION SIGNAL |
| 3 (VS=1, HS=1) | INCLUDES VERTICAL SYNCHRONIZATION SIGNAL AND HORIZONTAL SYNCHRONIZATION SIGNAL |

FIG. 13A

| WRITE PORT COMMAND REGISTER | WRITE PORT PARAMETER REGISTER |
|---|---|
| READ PORT PARAMETER REGISTER | FIFO STATUS REGISTER |
| REGISTER TRANSFER START REGISTER | REGISTER TRANSFER START POINTER REGISTER |
| REGISTER TRANSFER END POINTER REGISTER | — |

FIG. 13B

| FPDRDY POLARITY | RGB I/F DATA BUS WIDTH | VIDEO INVERSION | DISPLAY BLANK | FPSHIFT POLARITY | RGB I/F CONTROL SIGNAL ENABLE | RGB I/F DATA TRANSFER ENABLE | INTERFACE SELECTION |
|---|---|---|---|---|---|---|---|

FIG. 13C

| REGISTER BIT VALUE | MODE | LCD1 INTERFACE | LCD2 INTERFACE |
|---|---|---|---|
| 00 | 1 | RGB INTERFACE | MPU INTERFACE |
| 01 | 2 | RGB INTERFACE | SERIAL INTERFACE |
| 10 | 3 | MPU INTERFACE | MPU INTERFACE |
| 11 | 4 | MPU INTERFACE | SERIAL INTERFACE |

FIG. 14A
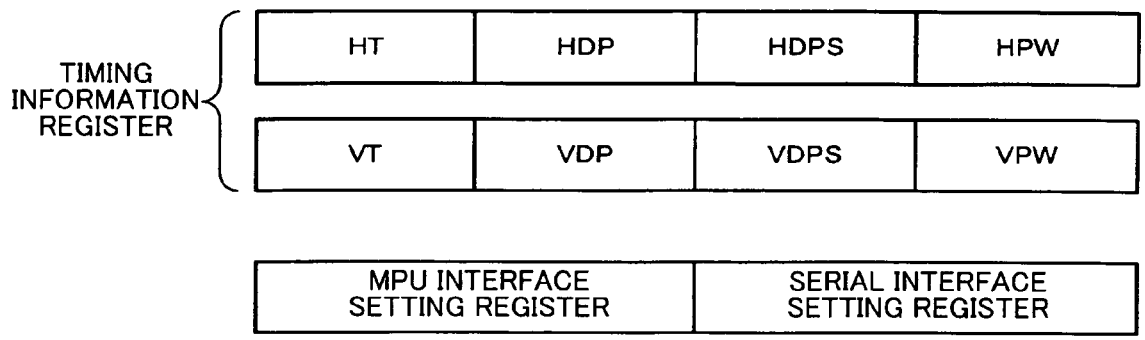
FIG. 14B
FIG. 14C  MPU INTERFACE SETTING REGISTER
SERIAL INTERFACE SETTING REGISTER
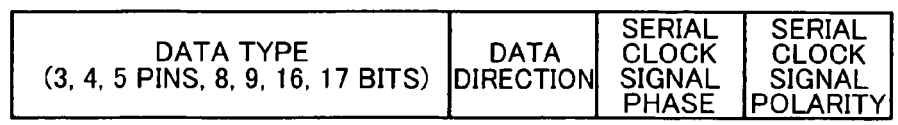

DATA TRANSFER CONTROL DEVICE AND ELECTRONIC INSTRUMENT GENERATING INTERFACE SIGNAL OF SIGNAL TYPE ACCORDING TO INTERFACE INFORMATION SET IN INTERNAL REGISTER

Japanese Patent Application No. 2004-66029, filed on Mar. 9, 2004, is hereby incorporated by reference in its entirety.

BACKGROUND OF THE INVENTION

The present invention relates to a data transfer control device and an electronic instrument.

In recent years, a high-speed serial transfer interface such as low voltage differential signaling (LVDS) has attracted attention as an interface aiming at reducing EMI noise or the like. In such a high-speed serial transfer, data transfer is implemented by causing a transmitter circuit to transmit serialized data using differential signals and a receiver circuit to differentially amplify the differential signals. The Digital Visual Interface (DVI) or the like has been known as an interface for such a high-speed serial transfer (Japanese Patent Application Laid-open No. 2001-222249).

An ordinary portable telephone includes a first instrument section provided with buttons for inputting a telephone number or a character, a second instrument section provided with a main liquid crystal display (LCD), a sub LCD, or a camera, and a connection section such as a hinge which connects the first and second instrument sections. In this case, the number of interconnects passing through the connection section can be reduced by performing data transfer between a first substrate provided in the first instrument section and a second substrate provided in the second instrument section by serial transfer using differential signals.

However, when performing data transfer through such a connection section by serial transfer, it is desirable to reduce power consumption of a host-side data transfer control device and a target-side data transfer control device which control the serial transfer. It is also desirable to reduce the amount of data transferred through the serial bus. Furthermore, it is desirable to reduce the processing load imposed on a system device (CPU, display controller, or the like) which accesses the host-side data transfer control device and performs various settings.

The system device connected with the host-side data transfer control device through a system bus includes various interfaces. The device such as an LCD connected with the target-side data transfer control device through an interface bus also includes various interfaces. Therefore, provision of a data transfer control device which can flexibly deal with the interface of the system device or the device such as an LCD connected with the data transfer control device is demanded.

BRIEF SUMMARY OF THE INVENTION

According to a first aspect of the present invention, there is provided a data transfer control device which controls data transfer, the data transfer control device comprising:

a link controller which analyzes a received packet transferred from a host-side data transfer control device through a serial bus;

an interface circuit which generates interface signals and outputs the generated interface signals to an interface bus; and an internal register in which is set interface information for specifying signal types of the interface signals output from the interface circuit, wherein the interface circuit includes first to Nth interface circuits (N is an integer greater than one), each of the first to Nth interface circuits generating an interface signal of a signal type according to the interface information set in the internal register.

According to a second aspect of the present invention, there is provided a data transfer control device which controls data transfer, the data transfer control device comprising:

an interface circuit which performs interface processing between the data transfer control device and a system device;

a link controller which generates a packet to be transmitted to a target-side data transfer control device through a serial bus; and an internal register accessed by the system device through the interface circuit, wherein interface information for specifying signal types of interface signals output from another interface circuit of the target-side data transfer control device is set in the internal register by the system device; and wherein the link controller generates a packet having the interface information set in the internal register, and transmits the packet to the target-side data transfer control device through the serial bus.

According to a third aspect of the present invention, there is provided an electronic instrument, comprising:

the above-described target-side data transfer control device;

a host-side data transfer control device connected to the target-side data transfer control device through the serial bus; and one or more devices connected to the target-side data transfer control device through the interface bus.

According to a fourth aspect of the present invention, there is provided an electronic instrument, comprising:

the above-described host-side data transfer control device;

a target-side data transfer control device connected to the host-side data transfer control device through the serial bus; and one or more devices connected to the target-side data transfer control device through the interface bus.

BRIEF DESCRIPTION OF THE SEVERAL VIEWS OF THE DRAWING

FIGS. 2A and 2B are illustrative of a method according to one embodiment of the present invention.

FIGS. 7A and 7B show format examples of packets.

FIG. 8 is illustrative of a port number.

FIG. 9 is illustrative of a synchronization signal code.

FIGS. 13A, 13B, and 13C show a port access register and the like.

FIGS. 14A, 14B, and 14C show an LCD1 setting register and the like.

DETAILED DESCRIPTION OF THE EMBODIMENTS

Figure 1:
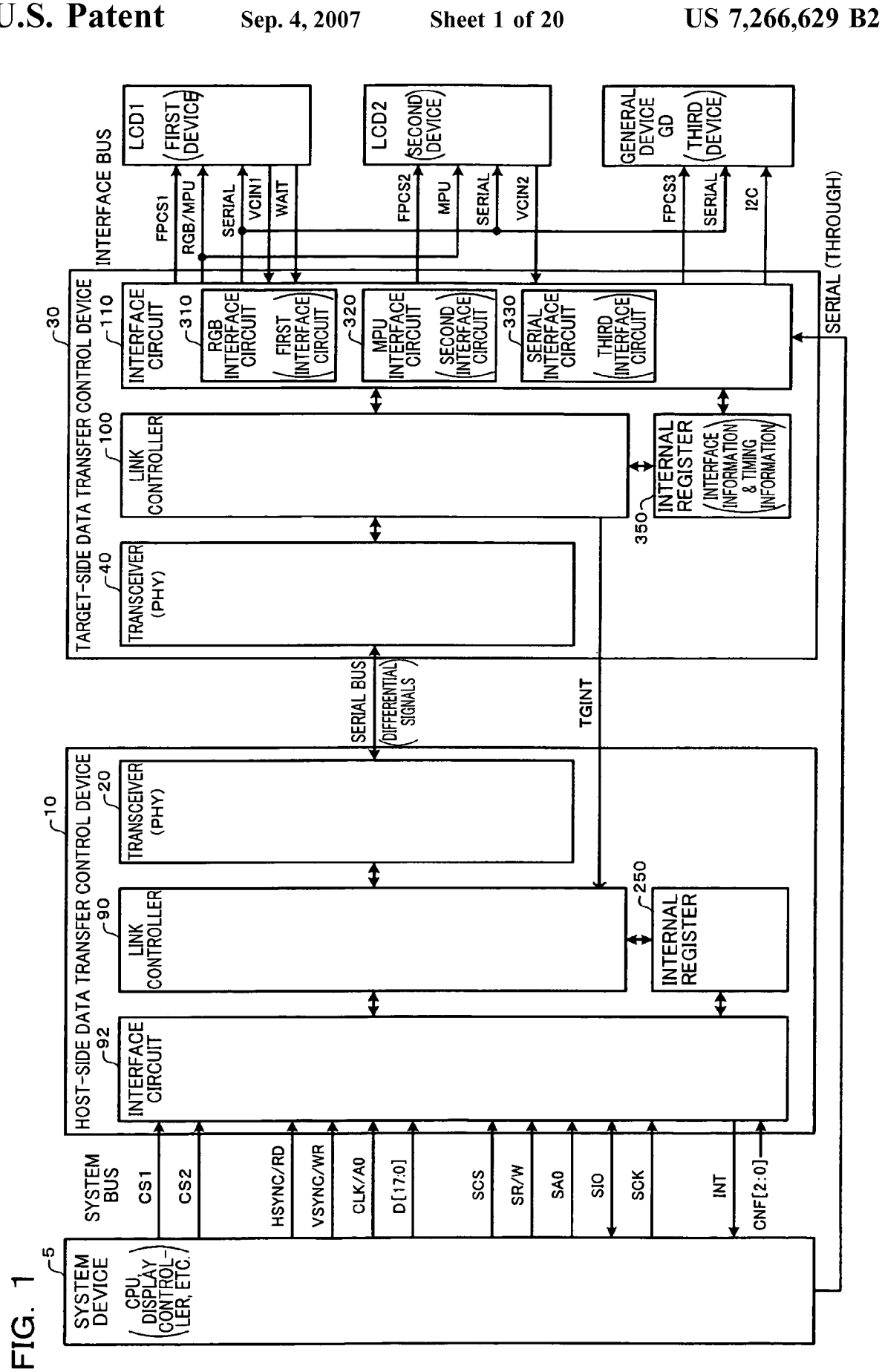
FIG. 1 shows host-side and target-side data transfer control devices.

The present invention has been achieved in view of the above-described technical problem, and may provide a data transfer control device which can flexibly deal with various interfaces of devices connected thereto, and an electronic instrument including the same.

According to one embodiment of the present invention, there is provided a data transfer control device which controls data transfer, the data transfer control device comprising:

a link controller which analyzes a received packet transferred from a host-side data transfer control device through a serial bus;

an interface circuit which generates interface signals and outputs the generated interface signals to an interface bus; and an internal register in which is set interface information for specifying signal types of the interface signals output from the interface circuit, wherein the interface circuit includes first to Nth interface circuits (N is an integer greater than one), each of the first to Nth interface circuits generating an interface signal of a signal type according to the interface information set in the internal register.

In this embodiment, the interface information is set in the internal register. The interface circuit includes the first to Nth interface circuits. The interface signals (first to Nth interface signals) of the signal types according to the interface information set in the internal register are respectively generated by the first to Nth interface circuits, and output to the interface bus. This enables the interface signals of various signal types to be generated based on the interface information. Therefore, a data transfer control device which can flexibly deal with various interfaces of devices connected thereto can be provided.

In this data transfer control device, the interface information may be set in the internal register based on a packet transferred from the host-side data transfer control device through the serial bus.

This enables the interface information which specifies the signal types of the interface signals in detail to be efficiently received from the host-side data transfer control device through the serial bus.

In this data transfer control device, a packet having data in a data field may be transferred from the host-side data transfer control device through the serial bus after the interface information has been set in the internal register; and each of the first to Nth interface circuits may output an interface signal including a signal of the data set in the packet in a signal type according to the interface information set in the internal register.

According to this feature, the interface information is transferred before performing data transfer, and a packet in which data is set in the data field is then transferred. Therefore, the amount of transfer data can be reduced when transferring a packet in which data is set in the data field, whereby the efficiency of data transfer through the serial bus can be improved.

In this data transfer control device, a packet transferred from the host-side data transfer control device through the serial bus may include a port number field for setting a port number; and each of the first to Nth interface circuits may output an interface signal to a port as destination, the port having been selected from among ports of one or more devices connected to the interface bus based on the port number set in the packet.

This enables the interface signals of various signal types to be output to various ports of one or more devices connected to the interface bus as a destination, whereby a data transfer control device which can flexibly deal with various interfaces of devices connected thereto can be provided.

In this data transfer control device, the interface circuit may include a multiplexer having inputs to which outputs of the first to Nth interface circuits are connected, and having an output to which the interface bus is connected; and the multiplexer may select one of the first to Nth interface circuits, and output an interface signal generated by the selected one of the first to Nth interface circuits to the interface bus.

In this case, the output from one of the first to Nth interface circuits may be selected using the port number set in the packet or the like.

In this data transfer control device, the first to Nth interface circuits may include an RGB interface circuit which generates an interface signal for an RGB interface, an MPU interface circuit which generates an interface signal for an MPU interface, and a serial interface circuit which generates an interface signal for a serial interface.

In this data transfer control device, the first to Nth interface circuits may not include at least one of the RGB interface circuit, the MPU interface circuit, and the serial interface circuit. Or, the first to Nth interface circuits may be configured to include an interface circuit other than the RGB interface circuit, the MPU interface circuit, and the serial interface circuit.

According to one embodiment of the present invention, there is provided a data transfer control device which controls data transfer, the data transfer control device comprising:

an interface circuit which performs interface processing between the data transfer control device and a system device;

a link controller which generates a packet to be transmitted to a target-side data transfer control device through a serial bus; and an internal register accessed by the system device through the interface circuit, wherein interface information for specifying signal types of interface signals output from another interface circuit of the target-side data transfer control device is set in the internal register by the system device; and wherein the link controller generates a packet having the interface information set in the internal register, and transmits the packet to the target-side data transfer control device through the serial bus.

In this embodiment, the interface information for the interface signals to be generated by the target is set in the internal register of the host-side data transfer control device by the system device. The set interface information is transmitted to the target-side data transfer control device through the serial bus. This enables the interface circuit of the target-side data transfer control device to generate interface signals of the signal types according to the transmitted interface information, whereby a data transfer control device which can flexibly deal with various interfaces of devices connected thereto can be provided.

In this data transfer control device, the internal register may include a register transfer start register; and the link controller may generate the packet having the interface information set in the internal register when the system device has instructed start of transfer by using the register transfer start register, and transmit the packet to the target-side data transfer control device through the serial bus.

This makes it possible to automatically transmit the interface information set in the host-side internal register to the target through the serial bus merely by causing the system device to instruct the register transfer start register to start the transfer. This enables the processing load imposed on the system device to be reduced.

In this data transfer control device, the link controller may generate a packet having data in a data field and transmit the generated packet to the target-side data transfer control device after transmitting the packet having the interface information to the target-side data transfer control device.

According to this feature, the interface information is transferred before performing data transfer, and a packet in which data is set in the data field is then transferred. Therefore, the amount of transfer data can be reduced when transferring a packet in which data is set in the data field, whereby the efficiency of data transfer through the serial bus can be improved.

According to one embodiment of the present invention, there is provided an electronic instrument, comprising:

the above-described target-side data transfer control device;

a host-side data transfer control device connected to the target-side data transfer control device through the serial bus; and one or more devices connected to the target-side data transfer control device through the interface bus.

According to one embodiment of the present invention, there is provided an electronic instrument, comprising:

the above-described host-side data transfer control device;

a target-side data transfer control device connected to the host-side data transfer control device through the serial bus; and one or more devices connected to the target-side data transfer control device through the interface bus.

These embodiments will be described in detail below. Note that the embodiments described below do not in any way limit the scope of the invention laid out in the claims herein. In addition, not all of the elements of the embodiments described below should be taken as essential requirements of the present invention.

1. Data Transfer Control Device

FIG. 1 shows host-side and target-side data transfer control devices 10 and 30. In this embodiment, a bridge function between a system bus and an interface bus is implemented by using the host-side and target-side data transfer control devices 10 and 30. The data transfer control devices 10 and 30 are not limited to the configurations shown in FIG. 1. Some of the circuit blocks shown in FIG. 1 may be omitted, or the connection between the circuit blocks may be changed, or a circuit block differing from those shown in FIG. 1 may be added. For example, a transceiver 20 may be omitted in the host-side data transfer control device 10, or a transceiver 40 may be omitted in the target-side data transfer control device 30.

The host (TX) side data transfer control device 10 and the target (RX) side data transfer control device 30 perform packet transfer through a serial bus for differential signals. In more detail, the data transfer control devices 10 and 30 transmit and receive packets by current-driving (or voltage-driving) differential signal lines of the serial bus.

The host-side data transfer control device 10 includes an interface circuit 92 for performing interface processing between the data transfer control device 10 and a system device 5 such as a CPU or a display controller. The system bus which connects the system device 5 with the interface circuit 92 includes signal lines for chip select signals CS1 and CS2. The system bus includes signal lines for signals HSYNC/RD, VSYNC/WR, CLK/A0, and D[17:0]. These signal lines are used as an RGB interface bus or a micro processor unit (MPU) interface bus.

In the case of using these signal lines as the RGB interface bus, the signals HSYNC/RD, VSYNC/WR, CLK/A0, and D[17:0] are respectively used as a horizontal synchronization signal, a vertical synchronization signal, a clock signal, and a data signal. The signals D[5:0], D[11:6], and D[17:12] of the signal D[17:0] are respectively used as R (red), G (green), and B (blue) data signals, for example. In the case of using the signal lines as the MPU interface bus, the signals HSYNC/RD, VSYNC/WR, CLK/A0, and D[17:0] are respectively used as a read signal, a write signal, an address 0 signal (command/parameter identification signal), and a data signal.

The system bus includes signal lines for signals SCS, SR/W, SA0, SIO, and SCK. These signals are used as serial interface signals. In more detail, the signals SCS, SR/W, SA0, SIO, and SCK are respectively used as a chip select signal, a read/write signal, an address 0 signal, a data signal, and a clock signal for the serial interface. In a 5-pin type serial interface, all of the signals SCS, SR/W, SA0, SIO, and SCK are used. In a 4-pin type serial interface, the signal SR/W is not used. In a 3-pin type serial interface, the signals SR/W and SA0 are not used.

A signal INT is an interrupt signal from the host-side data transfer control device 10 to the system device 5. A terminal CNF[2:0] is a terminal for deciding the interface type between the system device 5 and the host-side data transfer control device 10. The interface between the system device 5 and the host-side data transfer control device 10 may be set to both the RGB interface and the type 80 MPU interface, may be set to both the RGB interface and the type 68 MPU interface, may be set to only the type 80 MPU interface, may be set to only the type 68 MPU interface, or may be set to only the serial interface by the setting of the terminal CNF[2:0].

The host-side data transfer control device 10 includes a link controller 90 (link layer circuit) which performs link layer processing. The link controller 90 performs processing of generating a packet (request packet, stream packet, or the like) transferred to the target-side data transfer control device 30 through the serial bus (LVDS), and transmitting the generated packet. In more detail, the link controller 90 initiates a transmission transaction and directs the transceiver 20 to transmit the generated packet.

The host-side data transfer control device 10 includes the transceiver 20 (PHY) which performs physical layer processing or the like. The transceiver 20 transmits a packet indicated by the link controller 90 to the target-side data transfer control device 30 through the serial bus. The transceiver 20 also receives a packet from the target-side data transfer control device 30. In this case, the link controller 90 analyzes the received packet and performs the link layer (transaction layer) processing.

The host-side data transfer control device 10 includes an internal register 250. The internal register 250 includes a port access register, a configuration register, an LVDS register, an interrupt control register, a target (RX) register, and the like. The system device 5 writes an address (command) or data (parameter) into the internal register 250 through the system bus, or reads read data, status information, or the like from the internal register 250. The content stored in the target register of the internal register 250 is transferred to an internal register 350 of the target-side data transfer control device 30. Specifically, the target-side internal register 350 is a subset (shadow register) of the host-side internal register 250.

The target-side data transfer control device 30 includes a transceiver 40 (PHY) which performs physical layer processing or the like. The transceiver 40 receives a packet from the host-side data transfer control device 10 through the serial bus. The transceiver 40 also transmits a packet to the host-side data transfer control device 10. In this case, a link controller 100 generates a packet to be transmitted and directs transmission of the generated packet.

The target-side data transfer control device 30 includes the link controller 100 (link layer circuit). The link controller 100 performs link layer (transaction layer) processing of receiving a packet from the host-side data transfer control device 10 and analyzing the received packet. A signal TGINT is an interrupt signal from the target-side data transfer control device 30 to the host-side data transfer control device 10.

The target-side data transfer control device 30 includes an interface circuit 110 which performs interface processing between the data transfer control device 30 and an LCD1, an LCD2, and a general device GD (first to Nth devices in a broad sense). The interface circuit 110 generates various interface signals (first to Nth interface signals), and outputs the generated interface signals to the interface bus. In more detail, the interface circuit 110 includes an RGB interface circuit 310, an MPU interface circuit 320, and a serial interface circuit 330 (first to Nth interface circuits in a broad sense). The RGB interface circuit 310, the MPU interface circuit 320, and the serial interface circuit 330 respectively generate and output RGB, MPU, and serial interface signals. The LCD1 and LCD2 are generic terms for a display panel and a display driver which drives the display panel.

The interface bus includes signal lines for signals FPCS1, FPCS2, FPCS3, VCIN1, VCIN2, and WAIT, and buses such as RGB/MPU, SERIAL, and I2C (Inter Integrated Circuit) buses. The signals FPCS1, FPCS2, and FPCS3 are chip select signals. The signals VCIN1 and VCIN2 are signals which indicate completion of writing of one frame, and the signal WAIT is a wait request signal. The RGB/MPU bus is an RGB or MPU interface bus. The RGB/MPU bus includes signal lines for a horizontal synchronization signal (read signal), a vertical synchronization signal (write signal), a clock signal, an address 0 signal, and a data signal in the same manner as the system bus. The SERIAL bus is a serial interface bus, and includes signal lines for a read/write signal, an address 0 signal, a data signal, and a clock signal for serial transfer. The 12C bus is a bus for performing serial transfer between comparatively close locations using two signal lines (clock signal and data signal).

The target-side data transfer control device 30 includes the internal register 350. The internal register 350 stores interface information for specifying the signal type (output format) of the interface signal output from the interface circuit 110 or the like. In more detail, the internal register 350 stores timing information for specifying the timing at which the signal level of the interface signal changes. In this case, the information stored in the host-side internal register 250 necessary for the target is transferred to the target through the serial bus (differential signal lines) and is written into the target-side internal register 350.

The configuration and operation in which the host-side data transfer control device 10 transmits a packet to the target-side data transfer control device 30 are mainly described below for convenience of description. However, the configuration and operation in which the target-side data transfer control device 30 transmits a packet to the host-side data transfer control device 10 are the same as described below.

2. Generation of Interface Signal

In this embodiment, the target (RX) side interface circuit 110 automatically generates the interface signals (interface control signal and data signal) based on the interface information set in advance. In more detail, the interface information for specifying the signal types of the interface signals (information for specifying the types of the interface signals and the output format and the output timing of the interface signals) is set in the target-side internal register 350, and the interface circuit 110 reads the interface information from the internal register 350. The interface circuit 110 includes the RGB interface circuit 310, the MPU interface circuit 320, and the serial interface circuit 330 (first to Nth interface circuits in a broad sense). The RGB interface circuit 310, the MPU interface circuit 320, and the serial interface circuit 330 respectively generate and output the interface signals (MPU interface signal, RGB interface signal, or serial interface signal) of the signal types (output format) according to the interface information set in the internal register 350.

The interface information in the internal register 350 is set based on a packet received from the host-side data transfer control device 10 through the serial bus (LVDS). Specifically, the system device 5 sets the interface information (output format) for the interface signals in the host-side internal register 250 as an initial setting before performing data transfer. The system device 5 directs start of register transfer using a register transfer start register included in the internal register 250. The interface information written into the internal register 250 is then packet-transferred from the host-side data transfer control device 10 to the target-side data transfer control device 30 through the serial bus. In more detail, a packet in which the interface information is set in a data field is packet-transferred, for example. The transferred interface information is written into the target-side internal register 350.

After the above-described initial setting, the system device writes data (command or parameter) into a port write register of the internal register 250. As a result, a packet in which data is set in the data field is transmitted from the host-side data transfer control device 10 to the target-side data transfer control device 30 through the serial bus. The RGB interface circuit 310, the MPU interface circuit 320, and the serial interface circuit 330 of the interface circuit 110 respectively output the RGB interface signal, the MPU interface signal, and the serial interface signal of the signal type according to the interface information set in the internal register 350 to the interface bus. In more detail, the interface control signal and the data signal which make up the interface signals are output to each port of the devices such as the LCD1 and the LCD2 through the interface bus. This enables the devices such as the LCD1 and the LCD2 to perform a display operation based on display data, for example.

An ordinary portable telephone includes a first instrument section (first shell) provided with buttons for inputting a telephone number or a character, a second instrument section (second shell) provided with a main display, a sub display, or a camera, and a connection section (hinge section) which connects the first and second instrument sections. In this case, the system device 5 is provided in the first instrument section, and the LCD1 which is the main display and the LCD2 which is the sub display are provided in the second instrument section.

In a conventional art, the system device 5 directly outputs the interface signals to the LCD1 and the LCD2. Therefore, the number of interconnects passing through the connection section between the first and second instrument sections is increased to a large extent, whereby it is difficult to design the connection section. Moreover, EMI noise may occur.

In this embodiment, the interface information and data are transferred from the host to the target through the serial bus using differential signals (may be single-end transfer), for example. Therefore, according to this embodiment, the number of interconnects passing through the connection section can be significantly reduced by providing the interconnect section of the serial bus in the connection section between the first and second instrument sections, whereby the design of the connection section can be facilitated. Moreover, occurrence of EMI noise can be reduced.

The following method may be employed as a comparative example. Specifically, the host-side data transfer control device 10 samples the interface signals from the system device 5 using a sampling clock signal at a high frequency (frequency twice the frequency of a pixel clock signal, for example), and transmits the sampling result information to the target-side data transfer control device 30 through the serial bus. The interface signals similar to the interface signals output from the system device 5 are output to the LCD1 and the LCD2 by causing the target-side data transfer control device 30 to reproduce the sampling result information.

However, according to the method of the comparative example, since the frequency of the sampling clock signal is increased in the host-side data transfer control device 10, power consumption is increased. Moreover, since the amount of data (amount of traffic) transferred through the serial bus is increased, efficient data transfer cannot be implemented.

In this embodiment, the interface information is transferred in advance before performing data transfer, and the RGB interface circuit 310, the MPU interface circuit 320, and the serial interface circuit 330 of the interface circuit 110 automatically generate the RGB interface signal, the MPU interface signal, and the serial interface signal based on the interface information. This makes it unnecessary for the host-side data transfer control device 10 to sample the interface signals from the system device 5 using a sampling clock signal at a high frequency, whereby power consumption can be reduced. Moreover, an interface signal of a proper signal type can be generated without successively transferring detailed information on the interface signal from the host to the target. Therefore, the amount of data transferred through the serial bus can be reduced, whereby efficient data transfer can be implemented.

There may be a case where the system device 5 does not include the RGB interface and the MPU interface and includes only the serial interface, for example. In this case, according to the method of the comparative example in which the interface signal from the system device 5 is merely sampled, the RGB interface signal and the MPU interface signal cannot be output to the LCD1 and the LCD2 connected to the interface bus.

In this embodiment, the interface information on the RGB interface and the MPU interface is set in the internal register 350 as shown in FIG. 2A. The RGB interface circuit 310 and the MPU interface circuit 320 can arbitrarily output the RGB interface signal and the MPU interface signal of the signal type according to the interface information set in the internal register 350, respectively. Therefore, even if the system device 5 includes only the serial interface as shown in FIG. 2A, the RGB interface signal and the MPU interface signal of a proper signal type can be output to the LCD1 and the LCD2.

In this embodiment, the interface information on the serial interface is set in the internal register 350. The serial interface circuit 330 can arbitrarily output the serial interface signal of the signal type according to the interface information set in the internal register 350. Therefore, even if the system device 5 includes only the MPU interface as shown in FIG. 2B, the serial interface signal of a proper signal type can be output to the LCD1 and the LCD2.

In this embodiment, a packet transferred through the serial bus for differential signals includes a port number field as described later. The interface circuit 110 (RGB interface circuit 310, MPU interface circuit 320, and serial interface circuit 330) outputs the interface signal to a port selected from among ports of the LCD 1 and the LCD2 (one or more devices in a broad sense) connected to the interface bus based on the port number as the destination. Therefore, whether to output the RGB/MPU interface signal to either the LCD1 or the LCD2 as the destination can be arbitrarily set in FIG. 2A based on the port number. In FIG. 2B, whether to output the serial interface signal to either the LCD1 or the LCD2 as the destination can be arbitrarily set based on the port number. This enables provision of a data transfer control device which can flexibly deal with various interfaces of the devices connected thereto.

3. Signal Waveform of Interface Signal

Figure 3A:
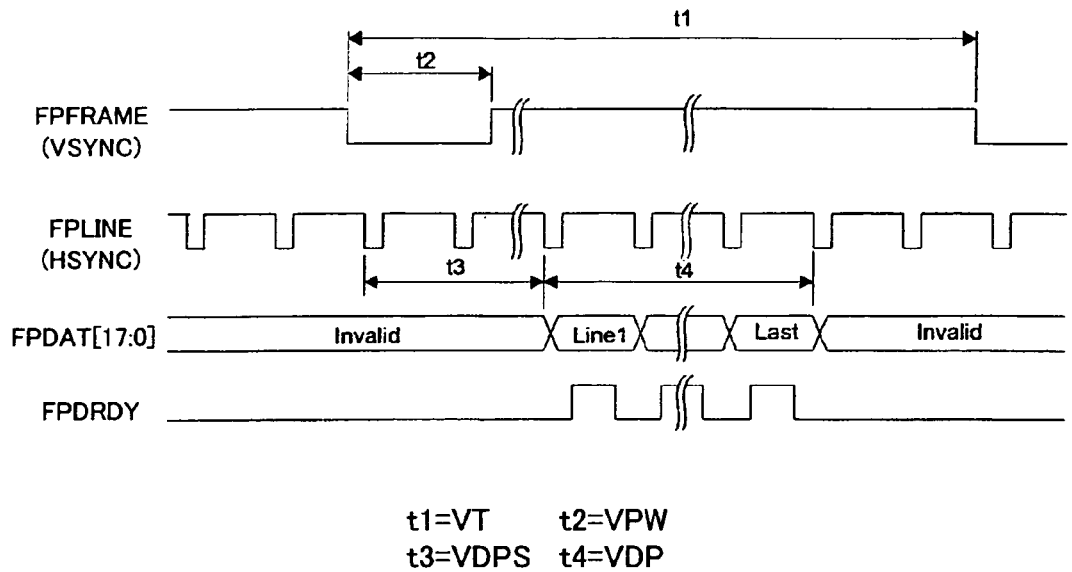
FIGS. 3A and 3B show signal waveform examples of RGB interface signals.
Figure 3B:
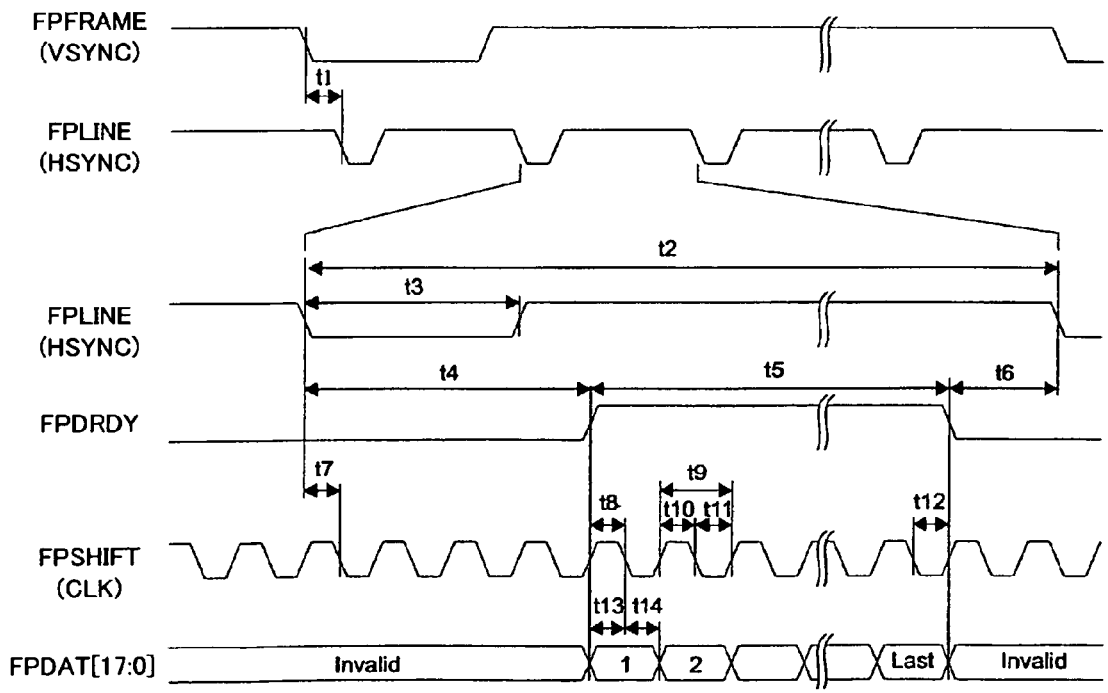

FIGS. 3A and 3B show signal waveform examples of the RGB interface signals generated by the RGB interface circuit 310 of the interface circuit 110. In FIGS. 3A and 3B, a signal FPFRAME is a vertical synchronization signal, a signal FPLINE is a horizontal synchronization signal, a signal FPDAT[17:0] is an RGB data signal, a signal FPDRDY is a data ready signal, and a signal FPSHIFT is a clock signal (pixel clock signal). These signals are RGB bus interface signals.

As shown in FIG. 3A, when the signal FPFRAME has become active and the signal FPLINE has become active a given number of times, a non-display period (front porch)

transitions to a display period, whereby the data signal FPDAT[17:0] of the first line (first scan line) is output. When the data signals of all the lines have been output, the display period transitions to the non-display period (back porch).

FIG. 3B is an enlarged signal waveform diagram showing the state in which the data signal for one line is transferred. Each bit of the data signal FPDATA[17:0] for one line is output in synchronization with the rising edge of the clock signal FPSHIFT after the signal FPDRDY has become active, for example.

In this embodiment, t1=VT, t2=VPW, t3=VDPS, and t4=VDP shown in FIG. 3A are set in the target-side internal register 350 as the timing information (interface information in a broad sense). t2=HT, t3=HPW, t4=HDPS, and t5=HDP shown in FIG. 3B are set in the internal register 350 as the timing information (interface information).

Figure 4:
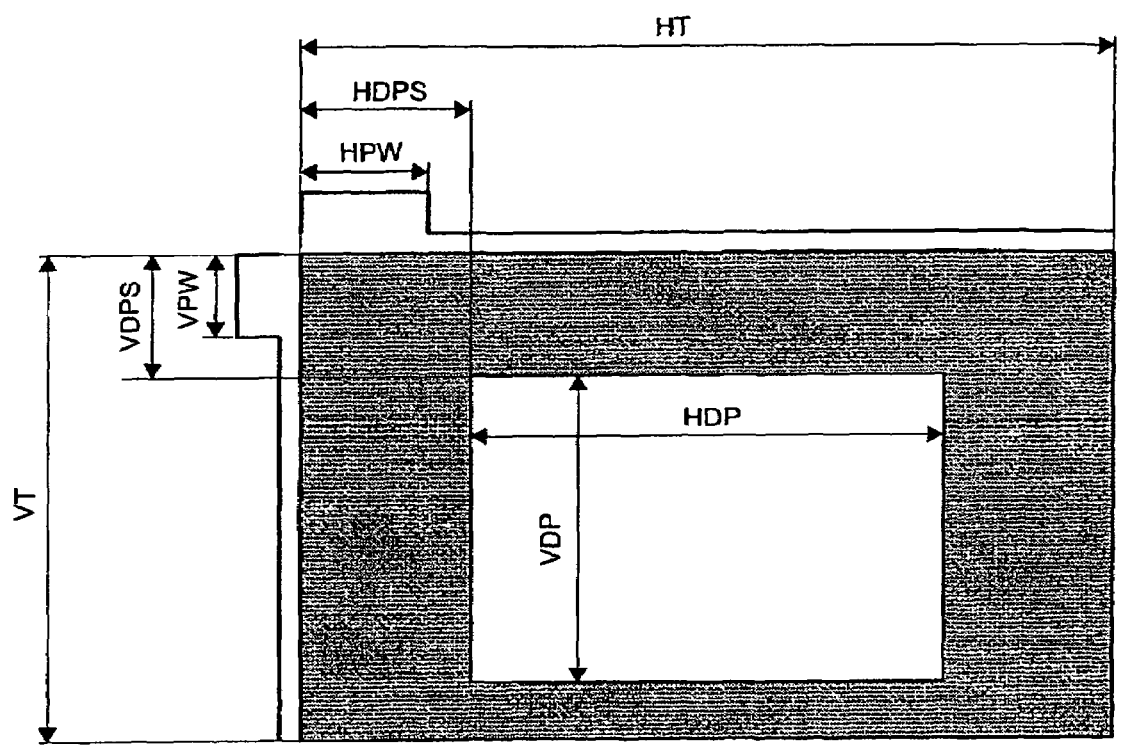
FIG. 4 is illustrative of timing information.

As shown in FIG. 4, HT (Horizontal Total) is the length of a horizontal synchronization period. HDP (Horizontal Display Period) is the length of a display period in the horizontal synchronization period. HDPS (Horizontal Display Period Start position) is the start position of the display period in the horizontal synchronization period. HPW (Horizontal Pulse Width) is the pulse width of the horizontal synchronization signal. VT (Vertical Total) is the length of a vertical synchronization period. VDP (Vertical Display Period) is the length of a display period in the vertical synchronization period. VDPS (Vertical Display Period Start position) is the start position of the display period in the vertical synchronization period. VPW (Vertical Pulse Width) is the pulse width of the vertical synchronization signal.

In this embodiment, the above timing information (HT, HDP, HDPS, HPW, VT, VDP, VDPS, and VPW) is written into the host-side internal register 250 by the system device 5 at the time of initialization. The timing information is transmitted to the target through the serial bus, and written into the target-side internal register 350. The RGB interface signals as shown in FIGS. 3A and 3B can be easily automatically generated by using the above timing information (interface information). The timing information HT, HDP, HDPS, HPW, VT, VDP, VDPS, and VPW need not be entirely stored in the internal register 350 as the timing information which can be set to an arbitrary value. A part of the timing information may be a fixed value. For example, the values HPW and VPW may be set to fixed values and may not be stored in the internal register 350 as the timing information.

In this embodiment, the timing information which is one type of the interface information which specifies the signal type of the RGB interface signal shown in FIGS. 3A and 3B is set in the internal register 350. The interface information such as the polarity (low active or high active) of the signals FPDRDY and FPSHIFT, and the bus width of RGB data is also set in the internal register 350 in addition to the timing information.

Figure 5A:
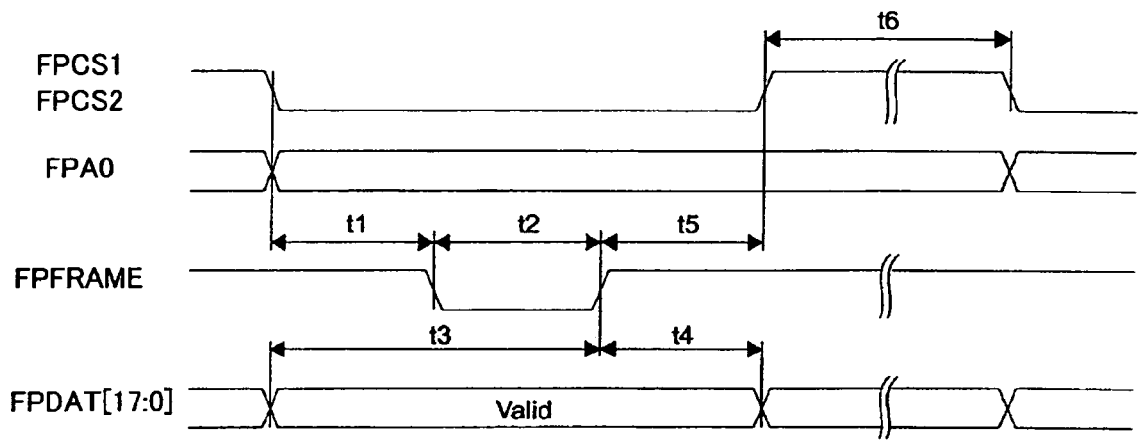
FIGS. 5A and 5B show signal waveform examples of MPU interface signals.
Figure 5B:
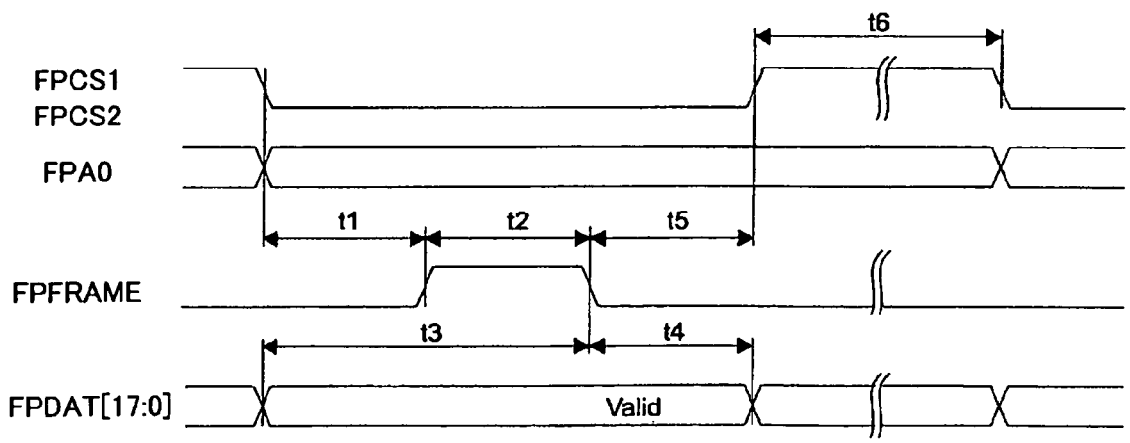

FIGS. 5A and 5B show waveform examples of the MPU interface signals. FIG. 5A is a waveform example of the type 80 MPU (parallel) interface signals, and FIG. 5B is a waveform example of the type 68 MPU interface signals. These MPU interface signals are generated by the MPU interface circuit 320. In FIGS. 5A and 5B, signals FPCS1 and FPCS2 are chip select signals, a signal FPA0 is an address 0 signal which is an identification signal of a command (address) and a parameter (data), a signal FPFRAME is a write signal, and a signal FPDAT[17:0] is a data signal. The signal FPFRAME is used as the vertical synchronization signal in the RGB interface shown in FIGS. 3A and 3B. In this embodiment, the signal FPLINE is used as the horizontal synchronization signal in the RGB interface, and is used as the read signal in the MPU interface. In this embodiment, the signal lines of the interface bus are used (multiplexed) by different types of interface signals in order to reduce the number of signal lines (number of terminals).

In this embodiment, the interface information which specifies the signal type of the MPU interface signal shown in FIGS. 5A and 5B is set in the internal register 350. In more detail, the interface information such as the type of the MPU interface (type 80 or type 68), the polarity of the parameter/command, the data direction, and the data format (number of bits) is set in the internal register 350.

Figure 6A:
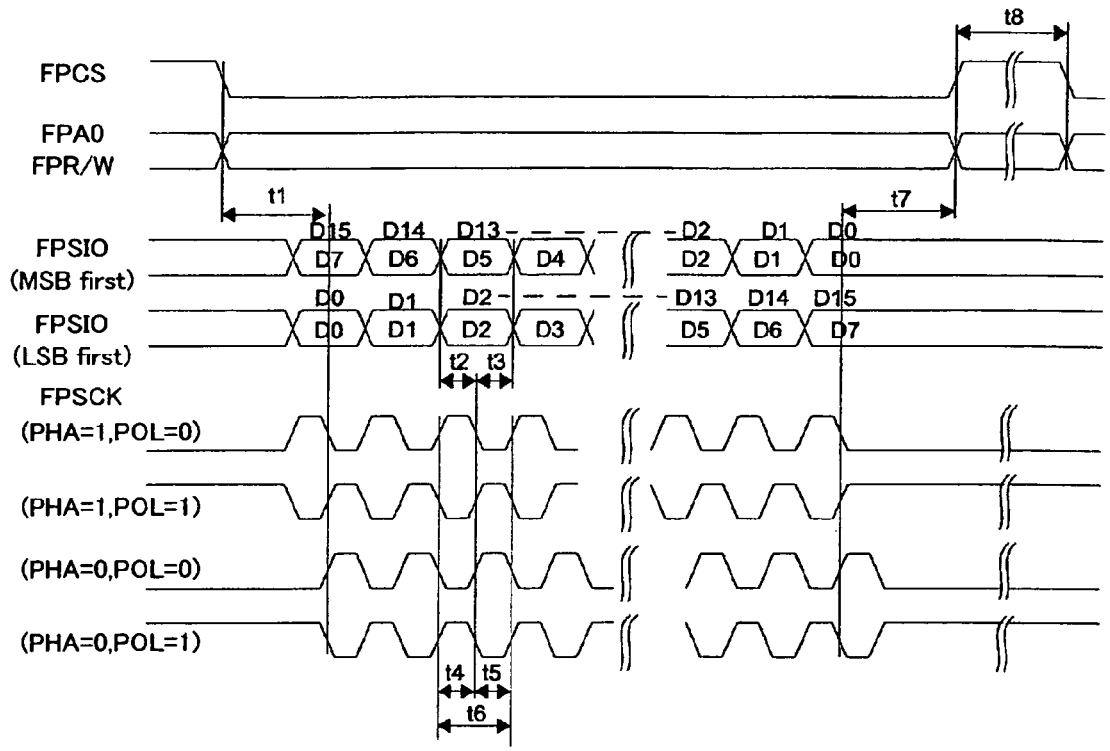
FIGS. 6A and 6B show signal waveform examples of serial interface signals.
Figure 6B:
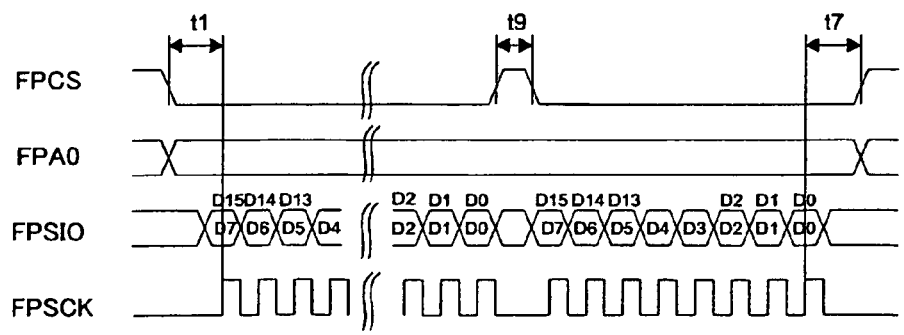

FIGS. 6A and 6B show waveform examples of the serial interface signals. FIG. 6A shows a waveform example of the serial interface signals during command/parameter transfer, and FIG. 6B shows a waveform example of the serial interface signals during burst transfer. These serial interface signals are generated by the serial interface circuit 330. In FIGS. 6A and 6B, a signal FPCS is a chip select signal, a signal FPA0 is an address 0 signal, a signal FPR/W is a read/write signal, a signal FPSIO is a data signal, and a signal FPSCK is a serial clock signal. In this embodiment, the data signal FPSIO can be set to "MSB first" or "LSB first" as shown in FIG. 6A. The phase and polarity of the signal FPSCK can be arbitrarily set. These settings may be performed based on the interface information (information which specifies the signal type of the interface signal) stored in the internal register 350. In this embodiment, t1 to t6 shown in FIG. 5A, t1 to t6 of FIG. 5B, and t1 to t9 shown in FIGS. 6A and 6B are fixed values. However, some or all of these values may be stored in the internal register 350 as the timing information which can be set to an arbitrary value.

In this embodiment, the interface information which specifies the signal type of the serial interface signal shown in FIGS. 6A and 6B is set in the internal register 350. In more detail, the interface information such as the data type (number of pins and number of bits), the data direction, the phase of the serial clock signal, and the serial polarity is set in the internal register 350.

4. Packet Configuration

FIGS. 7A and 7B show format examples of packets transferred through the serial bus (LVDS). The field configuration and the field arrangement of each packet are not limited to the examples shown in FIGS. 7A and 7B. Various modifications and variations may be made.

A request packet (write request packet or read request packet) shown in FIG. 7A is a packet for requesting writing or reading of data (parameter). The request packet includes fields of response request, packet type, label, retry, address size, data length, address (command), continuous, address automatic update, number of updates, port number, data (parameter), and cyclic redundancy check (CRC). The read request packet does not include the data field.

The response request field is a field for indicating whether or not to perform handshake using an acknowledge packet. The packet type field is a field for indicating the type of the packet. In this embodiment, a write request packet, a read request packet, a response packet, an acknowledge packet, a stream packet, and the like are included as the packet types. The label field is a field for setting a label for distinguishing the current transaction from other transactions. The retry field is a field for indicating whether or not the current transaction performs a retry. The address size field is a field for indicating the size of an address set in the address field of the packet. The data length field is a field for indicating the length of write data or read data. The address (command) field is a field for indicating the address of the data access destination (write destination or read destination). The address automatic update field is a field for setting an address automatic update mode, and the number-of-updates field is a field for setting the number of automatic updates of the address. The port number field is a field for setting the port number. The data (parameter) field is a field for setting data transferred by the packet. The CRC field is a field for checking an error of the header and data of the packet.

The stream packet shown in FIG. 7B is a packet for performing stream transfer of data (parameter). The stream transfer is data transfer which implements high-speed and continuous transfer while maintaining isochronicity between the transmitter side and the receiver side. The stream packet includes fields of packet type, label, data length, address (command), synchronization signal code, port number, data (parameter), and CRC.

5. Port Number

FIG. 8 shows an example of the port number set in the port number field of a packet. Various ports can be selected as the destination of packet transfer by using the port number. For example, when the port number set in a packet is "01", a parallel port (RGB/MPU port) of the LCD1 is the destination of packet transfer (data set in the packet or the like). When the port number is "02", "03", "04", "05", or "06", a serial port of the LCD1, a parallel port (MPU port) of the LCD2, a serial port of the LCD2, a parallel port of the LCD3 (not shown), or a serial port of the LCD3 is the destination of packet transfer, respectively. When the port number is "10", "11", "12", or "3F", the general port 1, 2, or 3, or the internal register 350 is the destination of packet transfer, respectively.

In this embodiment, the output destination of the interface signal is set using the port number. In more detail, the interface circuit 110 outputs the interface signal to the port selected based on the port number set in a packet as the destination among the ports of the LCD1, the LCD2, and the general device GD (one or more devices in a broad sense) connected to the interface bus.

For example, when the port number set in a packet is "01", the interface signal including a signal of data set in the packet is output to the parallel port (RGB/MPU port) of the LCD1 as the destination. Specifically, the LCD1 is selected by the chip select signal FPCS1 shown in FIG. 1, and the interface signals (packet data signal and interface control signal) generated by the RGB interface circuit 310 or the MPU interface circuit 320 are output to the LCD1. When the port number set in a packet is "02", the LCD1 is selected by the chip select signal FPCS1, and the interface signals generated by the serial interface circuit 330 are output to the LCD1. When the port number set in a packet is "03", the LCD2 is selected by the chip select signal FPCS2, and the interface signals generated by the MPU interface circuit 320 are output to the LCD2. When the port number set in a packet is "04", the LCD2 is selected by the chip select signal FPCS2, and the interface signals generated by the serial interface circuit 330 are output to the LCD2.

When the port number set in a packet is "3F", the information transferred by the packet is output to the target-side internal register 350. This enables the information stored in the host-side internal register 250 to be transferred to the target-side internal register 350.

6. Synchronization Signal Code

FIG. 9 shows an example of the synchronization signal code set in the synchronization signal code field of a packet. A synchronization signal code of "0" (VS=0, HS=0) means that the packet does not include the synchronization signal. Specifically, since the synchronization signal (vertical synchronization signal or horizontal synchronization signal) has not been detected by the host, it is unnecessary for the target to output the synchronization signal. A synchronization signal code of "1" (VS=1, HS=0) means that the packet includes the vertical synchronization signal. Specifically, since the vertical synchronization signal has been detected by the host, it is necessary for the target to output the vertical synchronization signal. A synchronization signal code of "2" (VS=0, HS=1) means that the packet includes the horizontal synchronization signal. Specifically, since the horizontal synchronization signal has been detected by the host, it is necessary for the target to output the horizontal synchronization signal. A synchronization signal code of "3" (VS=1, HS=1) means that the packet includes the vertical synchronization signal and the horizontal synchronization signal. Specifically, since the vertical synchronization signal and the horizontal synchronization signal have been detected by the host, it is necessary for the target to output the vertical synchronization signal and the horizontal synchronization signal.

As shown in FIG. 7B, in this embodiment, a packet transferred from the host-side data transfer control device 10 through the serial bus (LVDS) includes the synchronization signal code field for setting the synchronization signal code. In this embodiment, the interface circuit 110 (RGB interface circuit 310) generates the synchronization signal (vertical synchronization signal or horizontal synchronization signal) based on the synchronization signal code set in the packet. In more detail, the interface circuit 110 generates the synchronization signal based on the timing information (HT, HDP, HDPS, HPW, VT, VDP, VDPS, and VPW) set in the internal register 350 (timing information register) and the synchronization signal code set in the packet.

Figure 10:
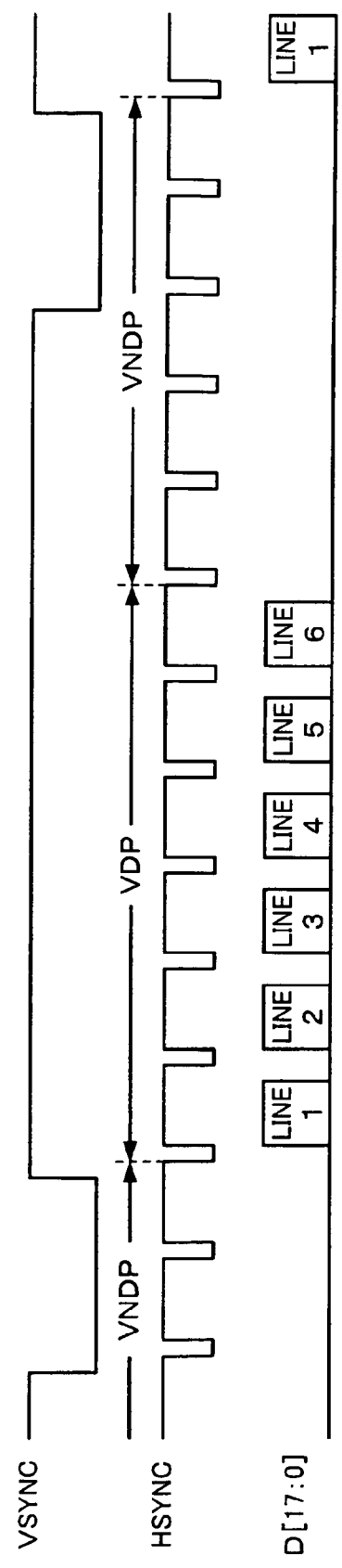
FIG. 10 is illustrative of RGB interface signals.

Suppose that the system device 5 outputs the RGB interface signals VSYNC, HSYNC, and D[17:0] as shown in FIG. 10 to the-host-side data transfer control device 10, for example. In this case, the host-side data transfer control device 10 detects the vertical synchronization signal VSYNC and the horizontal synchronization signal HSYNC input thereto. When the vertical synchronization signal VSYNC has been detected, the host-side data transfer control device 10 generates a packet in which the synchronization signal code is set to VS=1 and HS=0, and transmits the generated packet to the target-side data transfer control device 30. When the horizontal synchronization signal HSYNC has been detected, the host-side data transfer control device 10 generates a packet in which the synchronization signal code is set to VS=0 and HS=1, and transmits the generated packet to the target-side data transfer control device 30. When the vertical synchronization signal VSYNC and horizontal synchronization signal HSYNC have been detected, the host-side data transfer control device 10 generates a packet in which the synchronization signal code is set to VS=1 and HS=1, and transmits the generated packet to the target-side data transfer control device 30.

Figure 11:
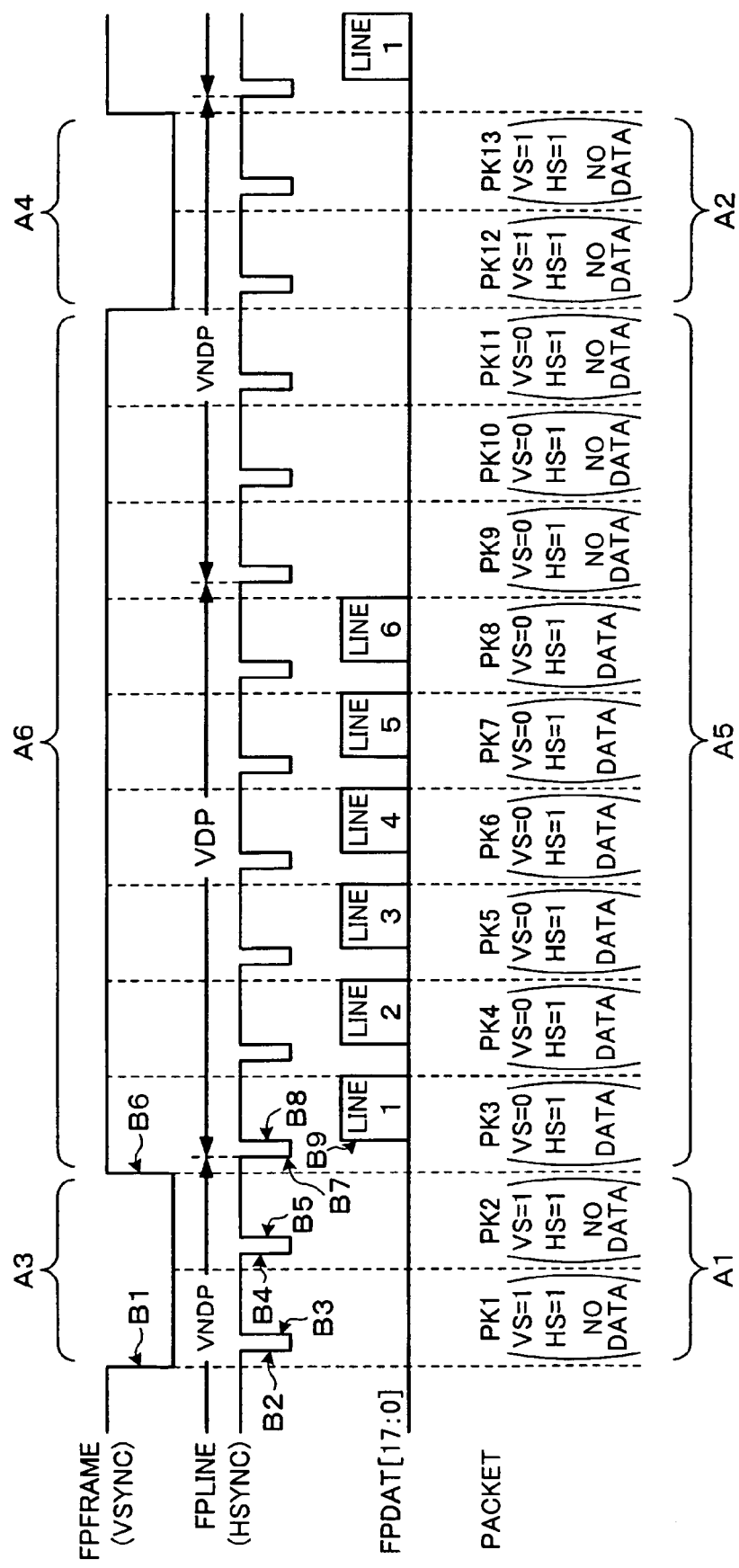
FIG. 11 is illustrative of a method of generating a synchronization signal by using a synchronization signal code.

The link controller 100 of the target-side data transfer control device 30 analyzes the synchronization signal code included in the packet received from the host-side data transfer control device 10. The RGB interface circuit 310 of the interface circuit 110 generates the signals FPFRAME and FPLINE as shown in FIG. 11 based on the synchronization signal code included in the packet. The signals FPFRAME and FPLINE correspond to the vertical synchronization signal VSYNC and the horizontal synchronization signal HSYNC shown in FIG. 10.

In more detail, the synchronization signal code included in packets PK1, PK2, PK12, and PK13 received at A1 and A2 shown in FIG. 11 is set to VS=1 and HS=1. Therefore, the signals FPFRAME and FPLINE are output in an active state as indicated by A3 and A4. The synchronization signal code included in packets PK3 to PK11 received at A5 is VS=0 and HS=1. Therefore, only the signal FPLINE is activated and output each time the packet is received as indicated by A6.

In this embodiment, the precise change timings of the signal levels of the signals FPFRAME, FPLINE, and FPDAT are adjusted based on the timing information (HT, HDP, HDPS, HPW, VT, VDP, VDPS, and VPW) set in the internal register 350. Specifically, the target-side data transfer control device 30 receives only information (synchronization signal code) which indicates the synchronization signal which has been changed from the host-side data transfer control device 10, and finely adjusts the actual timing at which the synchronization signal or the data signal is changed based on the timing information transmitted before data transfer.

When the target-side data transfer control device 30 has received the packet PK1 in which VS=1 and HS=1, the target-side data transfer control device 30 sets the signal FPFRAME to active (low level) as indicated by B1 shown in FIG. 11, and sets the signal FPLINE to active (low level) as indicated by B2 after a predetermined period (t1 shown in FIG. 3B) has elapsed. When a period of the timing information HPW (t3 shown in FIG. 3B) has elapsed, the target-side data transfer control device 30 sets the signal FPLINE to inactive (high level) as indicated by B3.

When the packet PK2 in which VS=1 and HS=1 has been received and a period of the timing information HT (t2 shown in FIG. 3B) has elapsed, the target-side data transfer control device 30 sets the signal FPLINE to active as indicated by B4. When a period of the timing information HPW has elapsed, the target-side data transfer control device 30 sets the signal FPLINE to inactive as indicated by B5.

When the packet PK3 in which VS=0 and HS=1 has been received and a period of the timing information VPW (t2 shown in FIG. 3A) has elapsed from the timing at B11, the target-side data transfer control device 30 sets the signal FPFRAME to inactive (high level) as indicated by B6. When a period of the timing information VDPS (t3 shown in FIG. 3A) has elapsed from the timing at B2, the target-side data transfer control device 30 sets the signal FPLINE to active as indicated by B7. When a period of the timing information HPW has elapsed from the timing at B7, the target-side data transfer control device 30 sets the signal FPLINE to inactive as indicated by B8. When a period of the timing information HDPS (t4 shown in FIG. 3B) has elapsed from the timing at B7, the target-side data transfer control device 30 starts outputting the data signal FPDAT for the first line as indicated by B9.

As described above, in this embodiment, the timing information (interface information) is transferred from the host to the target before performing data transfer and is set in the internal register 350. A packet including the synchronization signal code is then transferred from the host to the target. As a result, the target-side interface circuit 110 outputs the synchronization signal of which the output is directed by the synchronization signal code to the interface bus while finely adjusting the output timing based on the timing information set in the internal register 350. This makes it unnecessary for the host to sample the interface signal from the system device 5 using a clock signal at a high frequency, whereby power consumption can be reduced. Moreover, since the amount of data transferred from the host to the target through the serial bus can be reduced, the data transfer efficiency can be improved.

7. Internal Register

Figure 12:
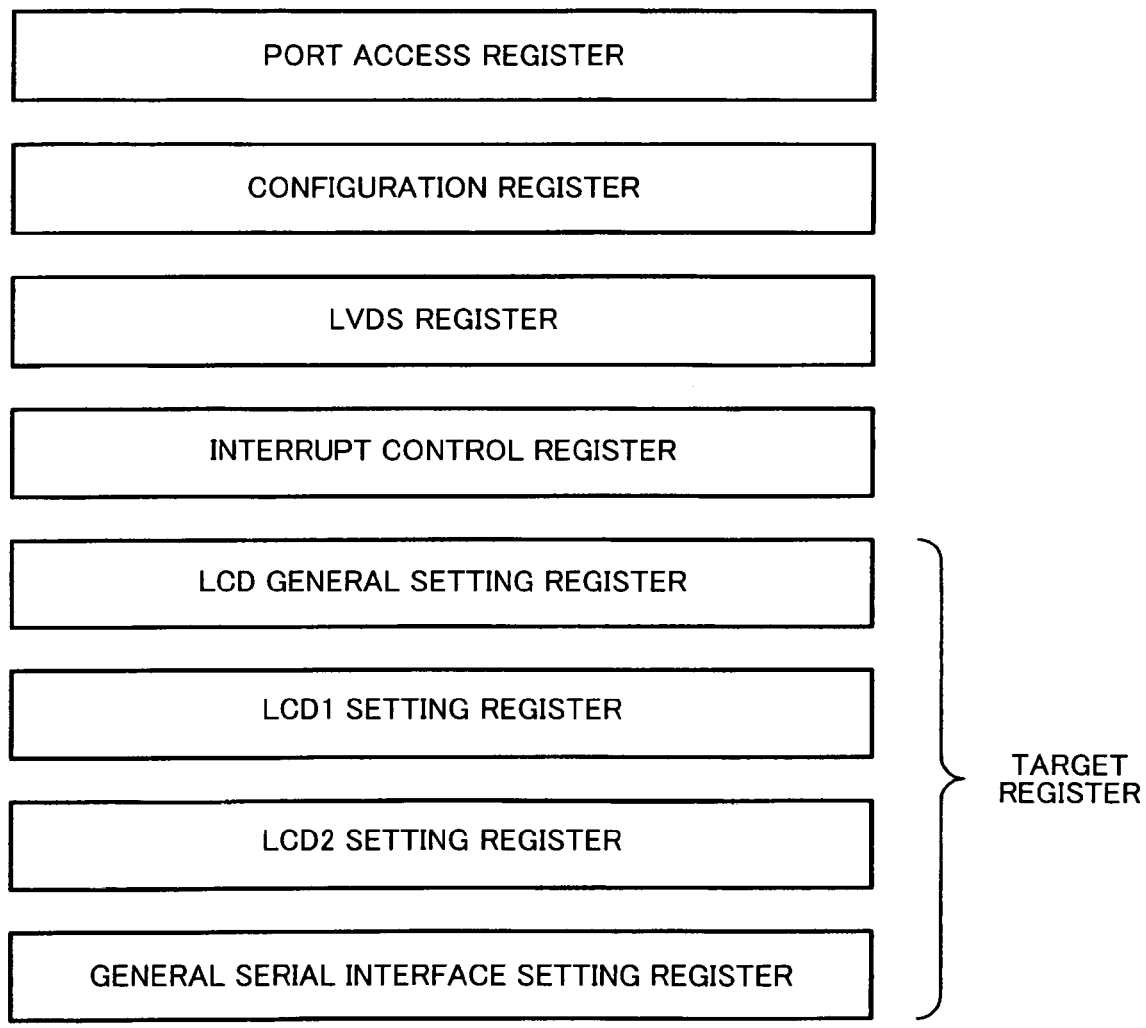
FIG. 12 shows an internal register.

FIG. 12 shows the host-side internal register 250. The host-side internal register 250 includes a port access register, a configuration register, an LVDS register, an interrupt control register, an LCD general setting register, an LCD1 setting register, an LCD2 setting register, a general serial interface setting register, and the like. Of these host-side registers, the LCD general setting register, the LCD1 setting register, the LCD2 setting register, and the general serial interface setting register are also target registers (shadow registers). Specifically, when the system device 5 has set information in these target registers and has directed start of register transfer, the content of the target registers is transferred from the host to the target through the serial bus and is written into the target-side internal register 350. FIG. 13A shows the port access register. In FIG. 13A, a register transfer start register is a register for the system device 5 to direct transfer of information on the register from the host-side internal register 250 to the target-side internal register 350. A register transfer start pointer register and a register transfer end pointer register are registers for the system device 5 to indicate a start pointer and an end pointer of the register to which the register information is transferred.

A write port command register shown in FIG. 13A is a register for the system device 5 to write a command (address) to be transmitted to a port. A write port parameter register is a register for the system device 5 to write a parameter (data) to be transmitted to a port. The read port parameter register is a register for the system device 5 to read a parameter (data) received from a port.

In this embodiment, the interface information for specifying the signal type of the interface signal output from the interface circuit 110 is set in the target (RX) register. FIG. 13B shows the LCD general setting register which is one of the target registers (interface information registers). The LCD general setting register includes bits for setting the polarity of the signal FPDRDY (see FIGS. 3A and 3B), the data bus width of the RGB interface, the presence or absence of video inversion, display blank, the polarity of the signal FPSHFT, and the like. The LCD general setting register also includes bits for setting output enable of the control signal of the RGB interface and enable of data transfer of the RGB interface and bits for selecting the interface.

As shown in FIG. 13C, in a mode 1 in which the interface select register bit value is "00", the LCD1 and LCD2 interfaces are set to the RGB interface and the MPU interface, respectively. Therefore, when the mode 1 is set, the RGB interface circuit 310 and the MPU interface circuit 320 respectively generate the interface signals transmitted to the LCD1 and the LCD2. In a mode 2 in which the register bit value is "01", the LCD1 and LCD2 interfaces are set to the RGB interface and the serial interface, respectively. Therefore, when the mode 2 is set, the RGB interface circuit 310 and the serial interface circuit 330 respectively generate the interface signals transmitted to the LCD1 and the LCD2. The modes 3 and 4 of which the register bit values are respectively "10" and "11" are as shown in FIG. 13C.

FIG. 14A shows the LCD1 setting register which is one of the target registers. The LCD1 setting register includes a timing information register in which the timing information HT, HDP, HDPS, HPW, VT, VDP, VDPS, and VPW shown in FIG. 4 is set. The LCD1 setting register includes an MPU interface setting register and a serial interface setting register. The LCD2 setting register shown in FIG. 14B also includes an MPU interface setting register and a serial interface setting register.

FIG. 14C shows the MPU interface setting register and the serial interface setting register. The MPU interface setting register includes bits for setting the type selection for selecting whether the type is type 80 (FIG. 5A) or type 68 (FIG. 5B), the parameter/command polarity (polarity of address A0), the data direction, the data format (selection of 8, 16, or 18 bits), and the like. The serial interface setting register includes bits for setting the data type (selection of 3, 4, or 5 pins and selection of 8, 9, 16, or 17 bits), the data direction, the serial clock signal phase, the serial clock signal polarity (see FIG. 6A), and the like.

As described above, in this embodiment, the signal type (output format) of the interface signal output from the interface circuit 110 can be set to various signal types by setting the interface information in the target register.

8. Detailed Description of Processing

Figure 15:
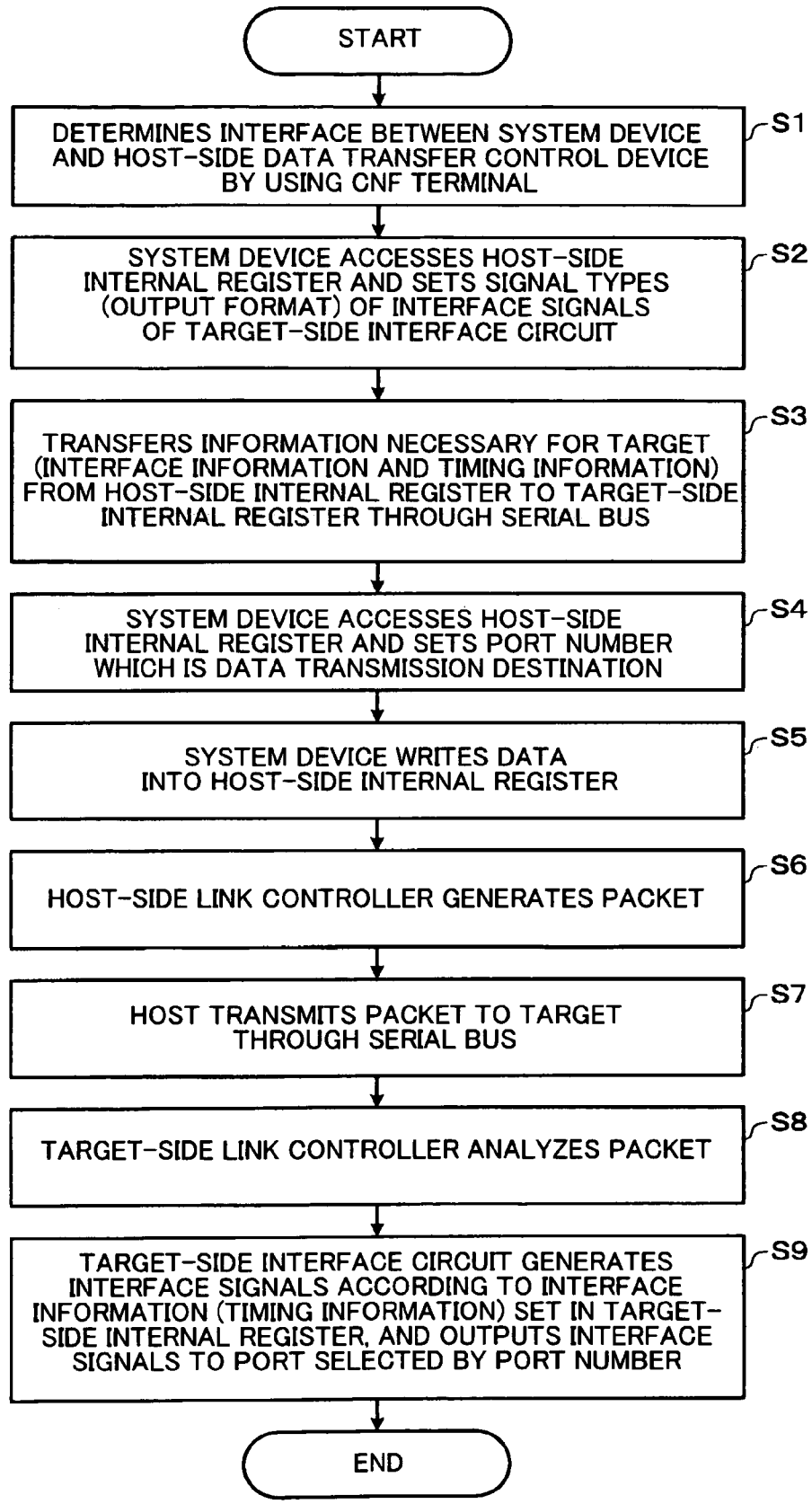
FIG. 15 is a flowchart showing the processing according to one embodiment of the present invention in detail.

The processing according to this embodiment is described in detail with a flowchart shown in FIG. 15. The interface between the system device 5 and the host-side data transfer control device 10 is determined using the CNF terminal [2:0] shown in FIG. 1 (step S1). The system device 5 accesses the host-side internal register 250, and sets the signal types (output format) of the interface signals of the target-side interface circuit 110 (step S2). Information set in the host-side internal register 250 necessary for the target (interface information and timing information) is transferred to the target-side internal register 350 through the serial bus (step S3).

The system device 5 accesses the host-side internal register 250 and sets the port number which is the data transmission destination (step S4). The system device 5 writes data into the host-side internal register 250 (step S5). The host-side link controller 90 generates a packet including the data (step S6), and the host transmits the packet to the target through the serial bus (step S7).

The target-side link controller 100 analyzes the received packet (step S8). The target-side interface circuit 110 generates the interface signals (data signal and interface control signal) according to the interface information (timing information) set in the target-side internal register 350, and outputs the interface signals to the port selected by the port number (step S9).

As described above, in this embodiment, the interface information for specifying the signal type of the interface signal output from the target-side interface circuit 110 (timing information for specifying the timing at which the signal level of the interface signal changes in a narrow sense) is set in the host-side internal register 250 by the system device 5. The host-side link controller 90 generates a packet including the interface information (timing information) set in the host-side internal register 250, and transmits the generated packet to the target-side data transfer control device 30 through the serial bus using differential signals. In more detail, when the system device 5 has directed start of transfer using the register transfer start register (see FIG. 13A) included in the internal register 250, the link controller 90 generates a packet including the interface information (timing information) and transmits (directs transmission of) the generated packet. The host-side link controller 90 generates a packet in which data is set in the data field after the packet including the interface information (timing information) has been transmitted, and transmits the generated packet to the target-side data transfer control device 30. This enables the interface signal to be efficiently generated using the interface information (timing information).

9. Serial Transfer Method Using Differential Signals

A serial transfer method according to one embodiment of the present invention and the transceivers 20 and 40 are described below with reference to FIG. 16.

Figure 16:
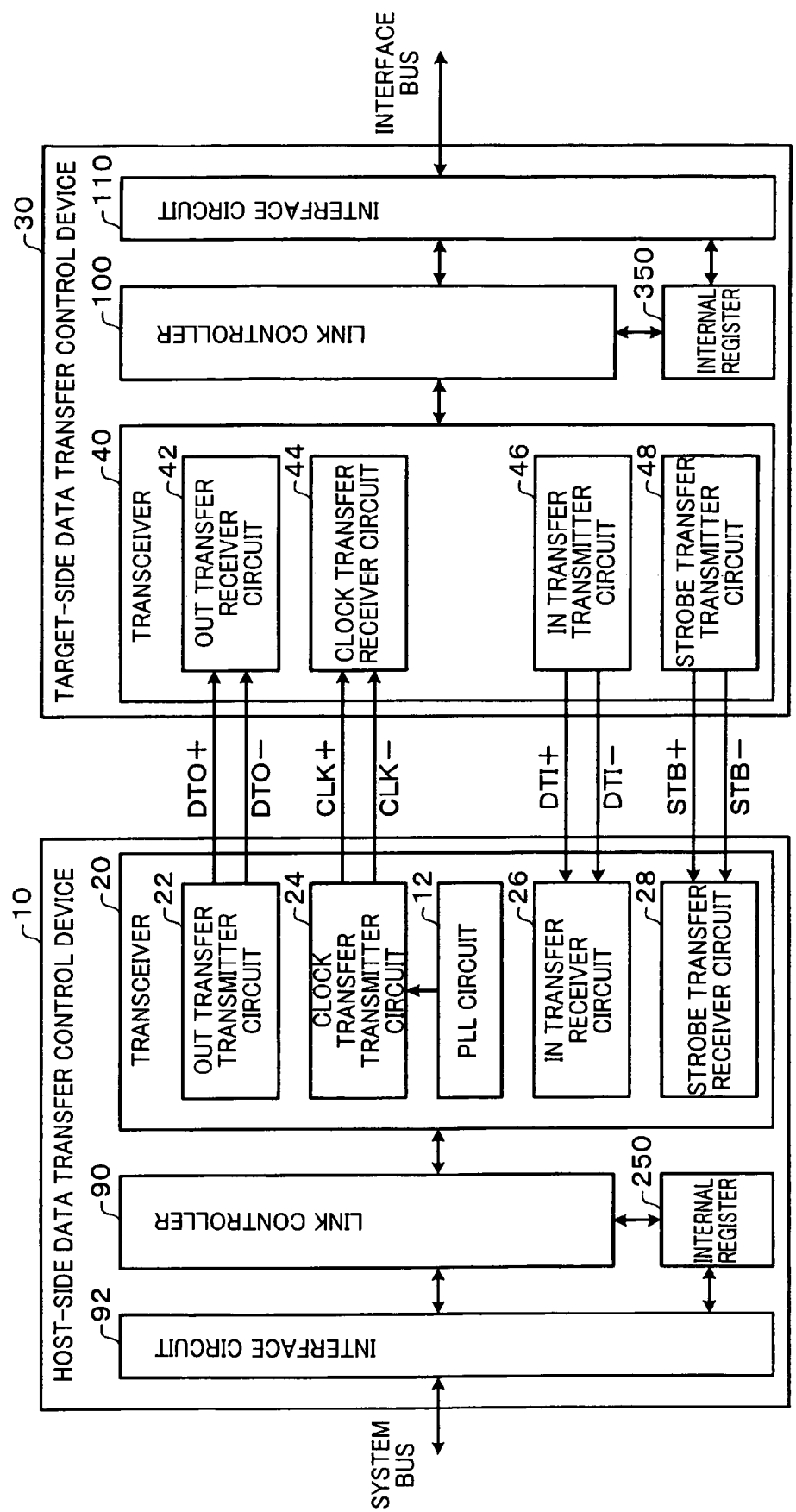
FIG. 16 shows host-side and target-side transceivers.

In FIG. 16, DTO+ and DTO− indicate data (OUT data) output from the host (data transfer control device 10) to the target (data transfer control device 30). CLK+ and CLK− indicate clock signals supplied from the host to the target. The host outputs the data DTO+/− in synchronization with the edge (rising edge for example; may be falling edge) of the clock signals CLK+/−. Therefore, the target can sample and store the data DTO+/− using the clock signals CLK+/−. In FIG. 16, the target operates based on the clock signals CLK+/− supplied from the host. Specifically, the clock signals CLK+/− serve as the system clock signal of the target. Therefore, a phase locked loop (PLL) circuit 12 (clock generation circuit in a broad sense) is provided in the host, and is not provided in the target.

DTI+ and DTI− indicate data (IN data) output from the target to the host. STB+ and STB− indicate strobes (clock signals in a broad sense) supplied from the target to the host. The target generates the strobes STB+/− based on the clock signals CLK+/− supplied from the host, and outputs the generated strobes STB+/−. The target outputs the data DTI+/− in synchronization with the edge (rising edge, for example; may be falling edge) of the strobes STB+/−. Therefore, the host can sample and capture the data DTI+/− using the strobes STB+/−.

Each of the data DTO+/−, the clock signals CLK+/−, the data DTI+/−, and the strobes STB+/− is transmitted by causing a transmitter circuit (driver circuit) to current-drive the corresponding differential signal line. In order to implement transfer at higher speed, two or more pairs of the DTO+/− differential signal lines and the DTI+/− differential signal lines may be provided.

The host-side transceiver 20 includes OUT transfer (data transfer in a broad sense) and clock transfer transmitter circuits 22 and 24, and IN transfer (data transfer in a broad sense) and strobe transfer (clock transfer in a broad sense) receiver circuits 26 and 28. The target-side transceiver 40 includes OUT transfer and clock transfer receiver circuits 42 and 44, and IN transfer and strobe transfer transmitter circuits 46 and 48. Part of the circuit blocks may be omitted.

The OUT transfer and clock transfer transmitter circuits 22 and 24 respectively transmit the data DTO+/− and the clock signals CLK+/− by current-driving the DTO+/− differential signal lines and the CLK+/− differential signal lines. The OUT transfer and clock transfer receiver circuits 42 and 44 respectively receive the data DTO+/− and the clock signals CLK+/− by performing a current/voltage conversion based on the current which flows through the DTO+/− differential signal lines and the CLK+/− differential signal lines, and performing comparison processing (differential amplification processing) between differential voltage signals (first and second voltage signals) obtained by the current/voltage conversion.

The IN transfer and clock transfer transmitter circuits 46 and 48 respectively transmit the data DTI+/− and the strobes STB+/− by current-driving the DTI+/− differential signal lines and the STB+/− differential signal lines. The IN transfer and strobe transfer receiver circuits 26 and 28 respectively receive the data DTI+/− and the strobes STB+/− by performing a current/voltage conversion based on the current which flows through the DTI+/− differential signal lines and the STB+/− differential signal lines, and performing comparison processing (differential amplification processing) between differential voltage signals (first and second voltage signals) obtained by the current/voltage conversion.

The transceivers 20 and 40 may include a parallel/serial conversion circuit, a serial/parallel conversion circuit, a code (8B/10B code, for example) encoder circuit, a decoder circuit, a code addition circuit, an error signal generation circuit, a frequency divider circuit, and the like in addition to the circuit blocks shown in FIG. 16. Some of these circuits may be included in the link controllers 90 and 100.

10. Link Controller and Interface Circuit

Figure 17:
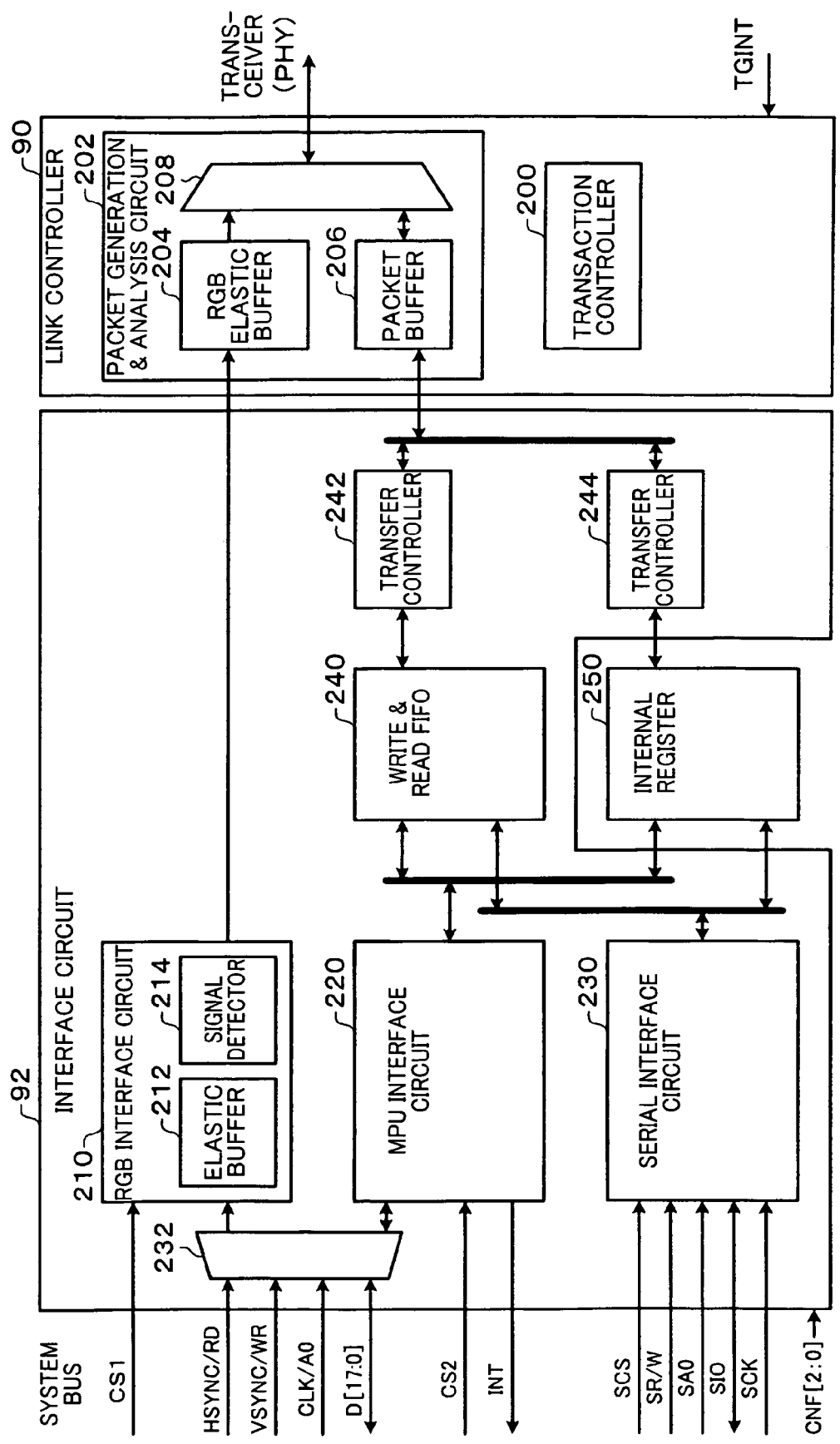
FIG. 17 shows a host-side link controller and interface circuit.
Figure 18:
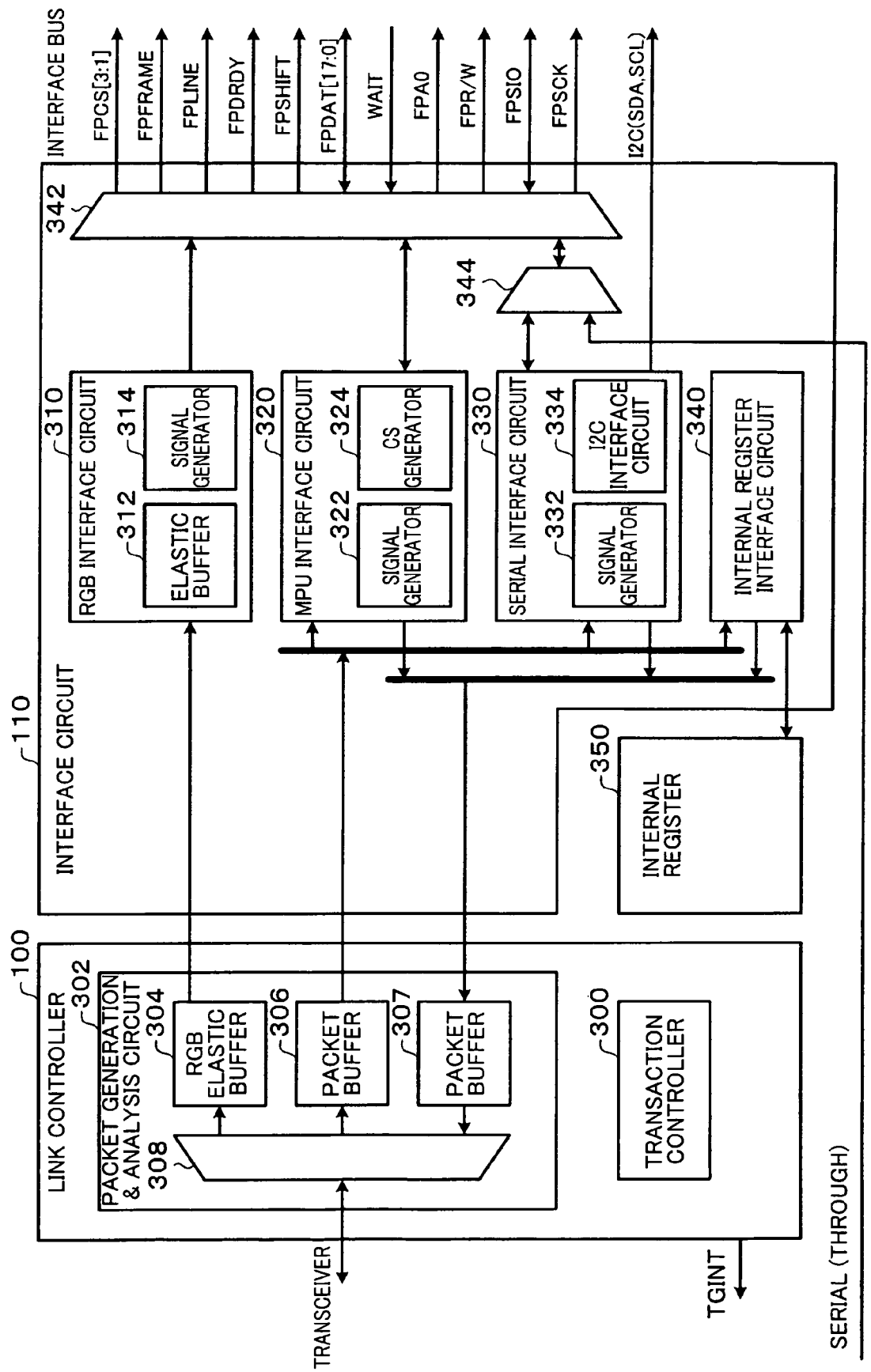
FIG. 18 shows a target-side link controller and interface circuit.

FIGS. 17 and 18 show the host-side link controller 90 and interface circuit 92 and the target-side link controller 100 and interface circuit 110. The link controller and interface circuit in this embodiment are not limited to the configurations shown in FIGS. 17 and 18. Some of the circuit blocks shown in FIGS. 17 and 18 may be omitted, or the connection between the circuit blocks may be changed, or a circuit block differing from the circuit blocks shown in FIGS. 17 and 18 may be added.

FIG. 17 shows the host-side link controller 90 and interface circuit 92. The link controller 90 includes a transaction controller 200 and a packet generation & analysis circuit 202. Part of these components may be omitted.

The transaction controller 200 performs transaction layer processing of data transfer. In more detail, the transaction controller 200 controls transfer of packets such as a request packet, a stream packet, and an acknowledge packet, and controls transaction made up of a plurality of packets.

The packet generation & analysis circuit 202 performs processing of generating a packet of which the transfer is directed by the transaction controller 200 and processing of analyzing a packet received from the target. In more detail, the packet generation & analysis circuit 202 receives information on the header and data from the interface circuit 92, and assembles a packet by combining the header and the data. The packet generation & analysis circuit 202 separates the packet received from the target into a header and data, and performs analysis processing of the received packet.

The packet generation & analysis circuit 202 includes an RGB elastic buffer 204, a packet buffer 206, and a multiplexer 208 (demultiplexer). The information on the RGB interface signal received from the interface circuit 92 is input to the RGB elastic buffer 204 which functions as a FIFO, and is transferred to the transceiver 20 through the multiplexer 208. The packet information (header and data information) received from the interface circuit 92 is input to the packet buffer 206 which functions as a FIFO, and is transferred to the transceiver 20 through the multiplexer 208. The packet information received from the transceiver 20 is transferred to the interface circuit 92 through the multiplexer 208 and the packet buffer 206.

The interface circuit 92 includes an RGB interface circuit 210, an MPU interface circuit 220, a serial interface circuit 230, a multiplexer (demultiplexer) 232, a write & read FIFO 240, and transfer controllers 242 and 244. The interface circuit 92 may have a configuration in which some of these blocks are omitted. The RGB interface circuit 210, the MPU interface circuit 220, and the serial interface circuit 230 are circuits for respectively performing RGB, MPU, and serial interface processing with the system device 5.

When the RGB interface is selected using the terminal CNF[2:0], the operation of the RGB interface circuit 210 is enabled. The RGB interface signals such as the horizontal synchronization signal HSYNC, the vertical synchronization signal VSYNC, the clock signal CLK, and the RGB data signal D[17:0] received from the system device 5 are input to the RGB interface circuit 210 through the multiplexer 232. The RGB data is temporarily stored in an elastic buffer 212 which functions as a FIFO. A signal detector 214 performs edge detection processing of the horizontal synchronization signal or the vertical synchronization signal or sampling processing of the edge detection signal and RGB data signal.

When the MPU interface is selected through the terminal CNF[2:0], the operation of the MPU interface circuit 220 is enabled. The MPU interface signals such as the read signal RD, the write signal WR, the address 0 signal A0, and the data signal D[17:0] received from the system device 5 are input to the MPU interface circuit 220 through the multiplexer 232. During reading, a read data signal from the MPU interface circuit 220 is output to the system bus as the data signal D[17:0] through the multiplexer 232.

When the serial interface is selected through the terminal CNF[2:0], the operation of the serial interface circuit 230 is enabled. The serial interface signals such as the chip select signal SCS, the read/write signal SR/W, the address 0 signal SA0, the data signal SIO, and the clock signal SCK received from the system device 5 are input to the serial interface circuit 230. During reading, a read data signal from the serial interface circuit 230 is output to the system bus as the data signal SIO.

The system device 5 accesses the internal register 250 through the MPU interface circuit 220 or the serial interface circuit 230, and sets various types of information in the internal register 250. The information stored in the write & read FIFO 240 and the internal register 250 is transferred to the link controller 90 through the transfer controllers 242 and 244. For example, the interface information (timing information) stored in the host-side internal register 250 is transferred to the link controller 90 through the transfer controller 244, and is transmitted to the target. The information received from the link controller 90 is written into the write & read FIFO 240 and the internal register 250 through the transfer controllers 242 and 244.

FIG. 18 shows the target-side link controller 100 and interface circuit 110. The link controller 100 includes a transaction controller 300 and a packet generation & analysis circuit 302. The link controller 100 may have a configuration in which some of these blocks are omitted.

The transaction controller 300 performs transaction layer processing of data transfer. The packet generation & analysis circuit 302 performs processing of generating a packet of which the transfer is directed by the transaction controller 300 and processing of analyzing a packet received from the host. In more detail, the packet generation & analysis circuit 302 receives information on the header and data from the interface circuit 110, and assembles a packet by combining the header and the data. The packet generation & analysis circuit 302 separates a packet received from the host into a header and data, and performs analysis processing of the received packet.

The packet generation & analysis circuit 302 includes an RGB elastic buffer 304, a reception packet buffer 306, a transmission packet buffer 307, and a multiplexer 308 (demultiplexer). The information on the RGB interface signal among the packet information received from the transceiver 40 through the multiplexer 308 is input to the RGB elastic buffer 304 which functions as a FIFO, and is transferred to the interface circuit 110 (RGB interface circuit 310). The packet information received from the transceiver 40 through the multiplexer 308 is input to the packet buffer 306 which functions as a FIFO, and is transferred to the interface circuit 110. The packet information received from the interface circuit 110 is input to the packet buffer 307, and is transferred to the transceiver 40 through the multiplexer 308.

The interface circuit 110 includes the RGB interface circuit 310, the MPU interface circuit 320, the serial interface circuit 330, an internal register interface circuit 340, and multiplexers (demultiplexers) 342 and 344. The interface circuit 110 may have a configuration in which some of these blocks are omitted.

The RGB interface circuit 310, the MPU interface circuit 320, and the serial interface circuit 330 are circuits for respectively performing RGB, MPU, and serial interface processing with the devices such as the LCD1, LCD2, and GD connected to the interface bus. The internal register interface circuit 340 is a circuit for performing processing of writing information (interface information and timing information) transferred from the host into the internal register 350.

The information on the RGB interface signal (RGB data and synchronization signal code) received from the link controller 100 is input to the RGB interface circuit 310. The RGB data is temporarily stored in an elastic buffer 312 which functions as a FIFO. The RGB interface signals such as the vertical synchronization signal, the horizontal synchronization signal, the ready signal, the clock signal, and the data signal are generated by a signal generator 314, and output as the signals FPFRAME, FPLINE, FPDRDY, FPSHIFT, and FPDAT[17:0] through the multiplexer 342.

The information on the MPU interface signal (MPU data) received from the link controller 100 is input to the MPU interface circuit 320. The MPU interface signals such as the write (read) signal, the data signal, and the address 0 signal are generated by a signal generator 322, and output as the signals FPFRAME (FPLINE), FPDAT[17:0], and FPA0 through the multiplexer 342. The chip select signal FPCS and the like are generated by a CS generator 324. The read data signal from the device connected to the interface bus is transferred to the link controller 100 through the multiplexer 342 and the MPU interface circuit 320.

The information on the serial interface signal (serial data) received from the link controller 100 is input to the serial interface circuit 330. The serial interface signals such as the read signal, the data signal, the address 0 signal, and the write/clock signal are generated by a signal generator 332, and output as the signals FPA0, FPR/W, FPSIO, and FPSCK through the multiplexers 344 and 342. An I2C interface circuit 334 generates and outputs an I2C interface signal. SERIAL bus signals (through) from the host are output to the interface bus as the signals FPA0, FPR/W, FPSIO, and FPSCK through the multiplexers 344 and 342.

The target register information (interface information and timing information) from the link controller 100 is transferred to and written into the internal register 350 through the internal register interface circuit 340.

As shown in FIG. 17, the target-side interface circuit 110 includes the multiplexer 342 (344) which is connected with the outputs from the RGB interface circuit 310, the MPU interface circuit 320, and the serial interface circuit 330 (first to Nth interface circuits in a broad sense) at its input and is connected with the interface bus at its output. The multiplexer 342 selects the output from one of the RGB interface circuit 310, the MPU interface circuit 320, and the serial interface circuit 330, and outputs the interface signals generated by the selected interface circuit to the interface bus. In this case, the output from one of the interface circuits 310, 320, and 330 may be selected using the port number set in the packet, for example.

11. Host-Side and Target-Side RGB Interface Circuits

Figure 19A:
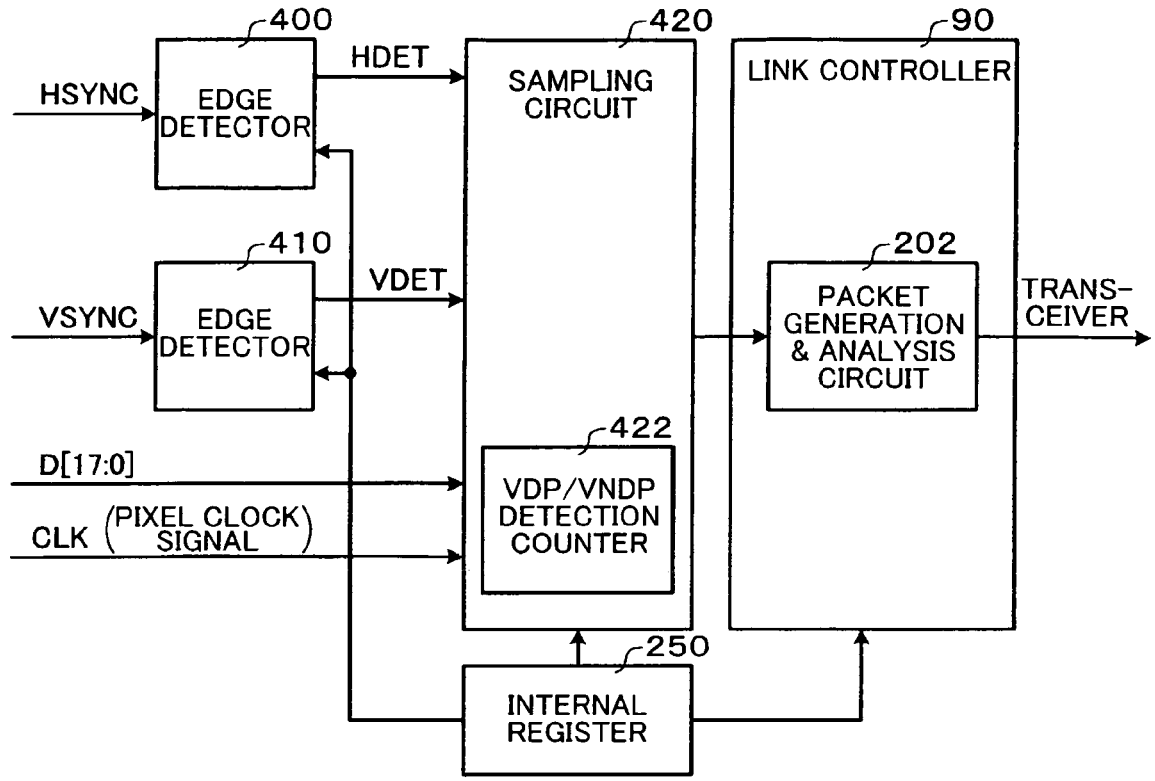
FIGS. 19A and 19B shows host-side and target-side RGB interface circuits.

A configuration example of the host-side RGB interface circuit 210 (signal detector 214) shown in FIG. 17 is described below using FIG. 19A. As shown in FIG. 19A, the RGB interface circuit 210 includes edge detectors 400 and 410 and a sampling circuit 420.

The edge detector 400 detects the edge of the horizontal synchronization signal HSYNC from the system device 5 and outputs an edge detection signal HDET. The edge detector 410 detects the edge of the vertical synchronization signal VSYNC from the system device 5 and outputs an edge detection signal VDET. In this case, whether to detect the rising edge or the falling edge is determined based on the setting in the internal register 250.

The sampling circuit 420 performs sampling processing of the edge detection signals HDET and VDET and the data signal D[17:0] based on the clock signal CLK. The clock signal CLK, which is a clock signal transferred from the system device 5, is a pixel clock signal for sampling pixel data of the RGB data. In this embodiment, since the sampling processing is performed based on the pixel clock signal CLK at a moderate frequency, power consumption of the host-side data transfer control device 10 can be reduced.

The sampling circuit 420 determines the synchronization signal code (see FIG. 9) set in the packet by performing the processing of sampling the edge detection signals HDET and VDET. When the edge detection signal VDET of the vertical synchronization signal has been detected, the synchronization signal code is set to "1" (VS=1, HS=0). When the edge detection signal HDET of the horizontal synchronization signal has been detected, the synchronization signal code is set to "2" (VS=0, HS=1). When the edge detection signal VDET of the vertical synchronization signal and the edge detection signal HDET of the horizontal synchronization signal have been detected, the synchronization signal code is set to "3" (VS=1, HS=1). This enables the synchronization signal code to be set in the synchronization signal code field of the packet transmitted to the target.

The sampling circuit 420 includes a VDP/VNDP detection counter 422 which performs count processing based on the edge detection signals HDET and VDET. The sampling circuit 420 performs judgment (discrimination) processing of the display period VDP and the non-display period VNDP based on the count result from the counter 422.

Figure 19B:
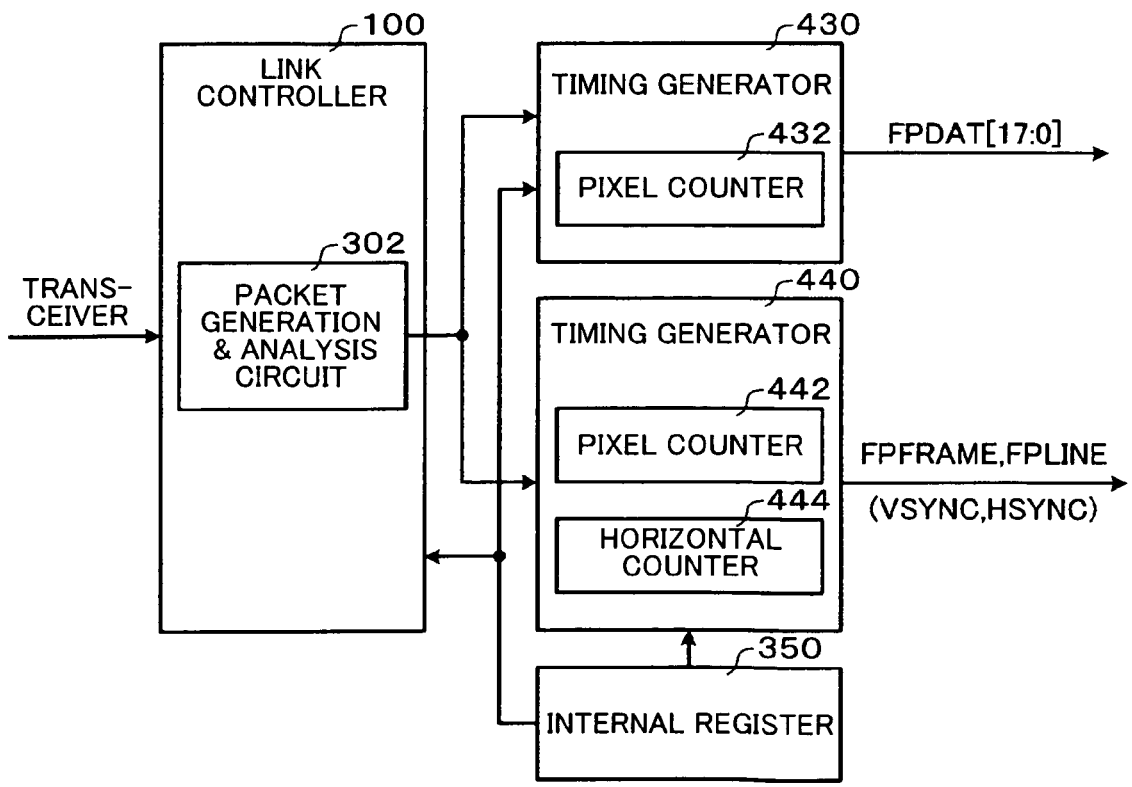

A configuration example of the target-side RGB interface circuit 310 (signal detector 314) shown in FIG. 18 is described below using FIG. 19B. As shown in FIG. 19B, the RGB interface circuit 310 includes timing generators 430 and 440. The timing generator 430 includes a pixel counter 432, and the timing generator 440 includes a pixel counter 442 and a horizontal (line) counter 444.

The timing generator 430 receives the information on the RGB data from the link controller 100, and receives the timing information (HDPS, HDP, and the like) from the internal register 350. The timing generator 430 generates and outputs the data signal FPDAT[17:0] which synchronizes with the pixel clock signal FPSHIFT as shown in FIG. 3B based on the count value from the pixel counter 432.

The timing generator 440 receives the header information including the synchronization signal code from the link controller 100, and receives the timing information (VT, VPW, VDPS, VDP, HT, HPW, and the like) from the internal register 350. The timing generator 440 generates and outputs the vertical synchronization signal FPFRAME and the horizontal synchronization signal FPLINE at the timings shown in FIGS. 3A and 3B based on the count value from the pixel counter 442 and the count value from the horizontal (line) counter 444.

As described above, in this embodiment, since the timing of the RGB interface signal is finely adjusted based on the timing information set in the internal register 350, power consumption can be reduced and the efficiency of data transfer can be improved.

12. Electronic Instrument

Figure 20:
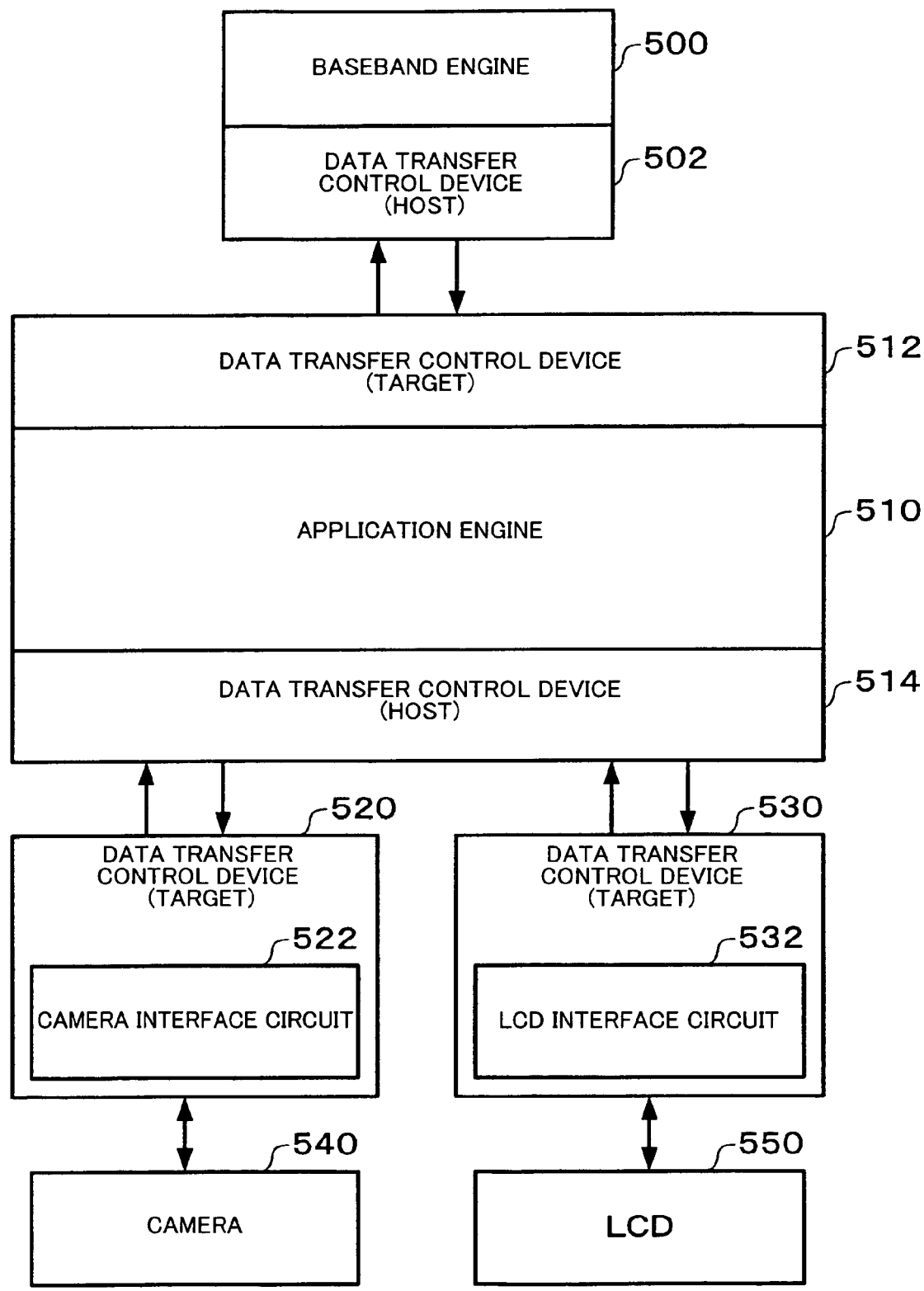
FIG. 20 shows an electronic instrument.

FIG. 20 shows an electronic instrument according to one embodiment of the present invention. The electronic instrument includes data transfer control devices 502, 512, 514, 520, and 530. The electronic instrument includes a baseband engine 500 (communication device in a broad sense), an application engine 510 (processor in a broad sense), a camera 540 (imaging device in a broad sense), and an LCD 550 (display device in a broad sense). In other words, the electronic instrument shown in FIG. 20 includes the target-side data transfer control devices 520 and 530, the host-side data transfer control device 514 connected with the target-side data transfer control devices 520 and 530 through a serial bus, and one or more devices 540 and 550 connected with the target-side data transfer control devices 520 and 530 through an interface bus. The electronic instrument may have a configuration in which some of these blocks are omitted. According to this embodiment, a portable telephone or the like having a camera function and a display function of a liquid crystal display (LCD) can be implemented. However, the electronic instrument in this embodiment is not limited to the portable telephone, and may be applied to various electronic instruments such as a digital camera, PDA, electronic notebook, electronic dictionary, or portable information terminal.

As shown in FIG. 20, the serial transfer described in this embodiment is performed between the host-side data transfer control device 502 provided to the baseband engine 500 and the target-side data transfer control device 512 provided to the application engine 510 (graphic engine). The serial transfer described in this embodiment is also performed between the host-side data transfer control device 514 provided to the application engine 510 and the data transfer control device 520 including a camera interface circuit 522 or the data transfer control device 530 including an LCD interface circuit 532.

According to this embodiment shown in FIG. 20, EMI noise can be reduced in comparison with a conventional electronic instrument. Moreover, power consumption of the electronic instrument can be further reduced by implementing a reduction of the scale and power consumption of the data transfer control device. In the case where the electronic instrument is a portable telephone, a serial signal line can be used as a signal line which passes through a connection section (hinge section) of the portable telephone, whereby mounting can be facilitated.

Although only some embodiments of the present invention have been described in detail above, those skilled in the art will readily appreciate that many modifications are possible in the embodiments without departing from the novel teachings and advantages of this invention. Accordingly, all such modifications are intended to be included within the scope of this invention. For example, any term (such as LCD1, LCD2, and GD, RGB, MPU, and serial interface circuits or timing information) cited with different term having broader or the same meaning (such as one or more devices, first to Nth interface circuits, or interface information) at least once in this specification or drawings can be replaced by the different terms in any place in this specification and the drawings.

The configurations and the operations of the data transfer control device and the electronic instrument are not limited to those described in the above embodiments, and various modifications can be made. Although the above embodiments describe the case where the first to Nth interface circuits are the RGB interface circuit, the MPU interface circuit, and the serial interface circuit, the first to Nth interface circuits may be two of the RGB interface circuit, the MPU interface circuit, and the serial interface circuit. Alternatively, the first to Nth interface circuits may be four or more interface circuits including the RGB interface circuit, the MPU interface circuit, the serial interface circuit, and another interface circuit. Part or the entirety of the target-side data transfer control device may be incorporated into the device (LCD1, LCD2, or the like) connected to the interface bus, or part or the entirety of the host-side data transfer control device may be incorporated into the system device.

What is claimed is:

1. A data transfer control device which controls data transfer, the data transfer control device comprising:
   a link controller which analyzes a received packet transferred from a host-side data transfer control device through a serial bus;
   an interface circuit which generates interface signals and outputs the generated interface signals to an interface bus; and
   an internal register in which interface information is set, the interface information being used for specifying signal types of the interface signals output from the interface circuit,
   wherein the interface circuit includes first to Nth interface circuits (N is an integer greater than one), each of the first to Nth interface circuits generating an interface signal of a signal type according to the interface information set in the internal register.

2. The data transfer control device as defined in claim 1, wherein the interface information is set in the internal register based on a packet transferred from the host-side data transfer control device through the serial bus.

3. The data transfer control device as defined in claim 2, wherein:
   a packet having data in a data field is transferred from the host-side data transfer control device through the serial bus after the interface information has been set in the internal register; and
   each of the first to Nth interface circuits outputs an interface signal including a signal of the data set in the packet in a signal type according to the interface information set in the internal register.

4. An electronic instrument, comprising:
   the target-side data transfer control device as defined in claim 3;
   a host-side data transfer control device connected to the target-side data transfer control device through the serial bus; and
   one or more devices connected to the target-side data transfer control device through the interface bus.

5. An electronic instrument, comprising:
the target-side data transfer control device as defined in claim 2;
a host-side data transfer control device connected to the target-side data transfer control device through the serial bus; and
one or more devices connected to the target-side data transfer control device through the interface bus.

6. The data transfer control device as defined in claim 1, wherein:
a packet transferred from the host-side data transfer control device through the serial bus includes a port number field for setting a port number; and
each of the first to Nth interface circuits outputs an interface signal to a port as destination, the port having been selected from among ports of one or more devices connected to the interface bus based on the port number set in the packet.

7. An electronic instrument, comprising:
the target-side data transfer control device as defined in claim 6;
a host-side data transfer control device connected to the target-side data transfer control device through the serial bus; and
one or more devices connected to the target-side data transfer control device through the interface bus.

8. The data transfer control device as defined in claim 1, wherein:
the interface circuit includes a multiplexer having inputs to which outputs of the first to Nth interface circuits are connected, and having an output to which the interface bus is connected; and
the multiplexer selects one of the first to Nth interface circuits, and outputs an interface signal generated by the selected one of the first to Nth interface circuits to the interface bus.

9. An electronic instrument, comprising:
the target-side data transfer control device as defined in claim 8;
a host-side data transfer control device connected to the target-side data transfer control device through the serial bus; and
one or more devices connected to the target-side data transfer control device through the interface bus.

10. The data transfer control device as defined in claim 1, wherein the first to Nth interface circuits include an RGB interface circuit which generates an interface signal for an RGB interface, an MPU interface circuit which generates an interface signal for an MPU interface, and a serial interface circuit which generates an interface signal for a serial interface.

11. An electronic instrument, comprising:
the target-side data transfer control device as defined in claim 10;
a host-side data transfer control device connected to the target-side data transfer control device through the serial bus; and
one or more devices connected to the target-side data transfer control device through the interface bus.

12. An electronic instrument, comprising:
the target-side data transfer control device as defined in claim 1;
a host-side data transfer control device connected to the target-side data transfer control device through the serial bus; and
one or more devices connected to the target-side data transfer control device through the interface bus.

13. A data transfer control device which controls data transfer, the data transfer control device comprising:
an interface circuit which performs interface processing between the data transfer control device and a system device;
a link controller which generates a packet to be transmitted to a target-side data transfer control device through a serial bus; and
an internal register accessed by the system device through the interface circuit
wherein interface information for specifying signal types of interface signals output from another interface circuit of the target-side data transfer control device is set in the internal register by the system device; and
wherein the link controller generates a packet having the interface information set in the internal register, and transmits the packet to the target-side data transfer control device through the serial bus.

14. The data transfer control device as defined in claim 13, wherein:
the internal register includes a register transfer start register; and
the link controller generates the packet having the interface information set in the internal register when the system device has instructed start of transfer by using the register transfer start register, and transmits the packet to the target-side data transfer control device through the serial bus.

15. An electronic instrument, comprising:
the host-side data transfer control device as defined in claim 14;
a target-side data transfer control device connected to the host-side data transfer control device through the serial bus; and
one or more devices connected to the target-side data transfer control device through the interface bus.

16. The data transfer control device as defined in claim 13, wherein the link controller generates a packet having data in a data field and transmits the generated packet to the target-side data transfer control device after transmitting the packet having the interface information to the target-side data transfer control device.

17. An electronic instrument, comprising:
the host-side data transfer control device as defined in claim 16;
a target-side data transfer control device connected to the host-side data transfer control device through the serial bus; and
one or more devices connected to the target-side data transfer control device through the interface bus.

18. An electronic instrument, comprising:
the host-side data transfer control device as defined in claim 13;
a target-side data transfer control device connected to the host-side data transfer control device through the serial bus; and
one or more devices connected to the target-side data transfer control device through the interface bus.

* * * * *

UNITED STATES PATENT AND TRADEMARK OFFICE
CERTIFICATE OF CORRECTION

PATENT NO. : 7,266,629 B2  Page 1 of 1
APPLICATION NO. : 11/063007
DATED : September 4, 2007
INVENTOR(S) : Hiroyasu Honda It is certified that error appears in the above-identified patent and that said Letters Patent is hereby corrected as shown below:

Column 8, Line 7:  "12C" should be --I2C--.

Column 15, Line 45:  "B11" should be --B1--.

Column 21, Line 55:  "12C" should be --I2C--.

Column 25, Line 13:  "selling" should be --setting--.

Signed and Sealed this

Sixth Day of May, 2008

JON W. DUDAS
*Director of the United States Patent and Trademark Office*